US011846001B2

(12) United States Patent
Rudnev et al.

(10) Patent No.: US 11,846,001 B2
(45) Date of Patent: Dec. 19, 2023

(54) SPLIT MULTIPLE COIL ELECTRIC INDUCTION HEAT TREATMENT SYSTEMS FOR SIMULTANEOUS HEATING OF MULTIPLE FEATURES OF A BEARING COMPONENT

(71) Applicant: INDUCTOHEAT, INC., Madison Heights, MI (US)

(72) Inventors: Valery I. Rudnev, Rochester Hills, MI (US); Gary A. Doyon, Grosse Pointe Farms, MI (US); Glenville Colin Desmier, Novi, MI (US); Robert J. Madeira, Milford, MI (US); Timothy Gerard Boussie, Sterling Heights, MI (US)

(73) Assignee: Inductoheat, Inc., Madison Heights, MI (US)

( * ) Notice: Subject to any disclaimer, the term of this patent is extended or adjusted under 35 U.S.C. 154(b) by 554 days.

(21) Appl. No.: 17/166,152

(22) Filed: Feb. 3, 2021

(65) Prior Publication Data

US 2021/0238704 A1 Aug. 5, 2021

Related U.S. Application Data

(60) Provisional application No. 62/970,237, filed on Feb. 5, 2020.

(51) Int. Cl.
*H05B 6/44* (2006.01)
*H05B 6/10* (2006.01)
(Continued)

(52) U.S. Cl.
CPC .................. *C21D 9/40* (2013.01); *C21D 1/42* (2013.01); *H05B 6/101* (2013.01); *H05B 6/44* (2013.01); *C21D 2211/001* (2013.01)

(58) Field of Classification Search
CPC ........ C21D 1/42; C21D 2211/001; C21D 9/40; H05B 6/101; H05B 6/40; H05B 6/44; Y02P 10/25
(Continued)

(56) References Cited

U.S. PATENT DOCUMENTS 2,277,372 A * 3/1942 Somes ................... H05B 6/101
219/676
5,023,419 A 6/1991 Langstedt
(Continued)

FOREIGN PATENT DOCUMENTS

| CN | 1771764 A | 5/2006 |
|---|---|---|
| EP | 3162903 A1 | 5/2017 |
| JP | 2000144237 A | 5/2000 |

OTHER PUBLICATIONS

J.W. Rosenlieb, et al., Feasibility of Induction Skin Hardened Tapered Roller Bearings for Engine Main-Shaft and Transmission Pinion Applications, Nov. 1974, National Technical Information Service (NTIS).
(Continued)

*Primary Examiner* — Quang T Van
(74) *Attorney, Agent, or Firm* — Philip O. Post

(57) ABSTRACT

A master inductor circuit is connected to an alternating current power source and a passive inductor circuit are assembled as a separable split inductor assembly to form at least one pair of a master heating inductor and a passive heating inductor where the master and passive inductor circuits are electromagnetically coupled without physical connection. A bearing component can be brought into the presence of the magnetic flux field created by the master and passive heating inductors to simultaneously induction heat one or more bearing features on the bearing component with subsequent quenching down austenitized bearing features on the bearing component.

21 Claims, 32 Drawing Sheets

(51) Int. Cl.
*C21D 9/40* (2006.01)
*C21D 1/42* (2006.01)

(58) Field of Classification Search
USPC ....... 219/635, 637, 638, 640, 641, 652, 671, 219/676, 677, 650, 655, 672, 643, 644
See application file for complete search history.

(56) References Cited

U.S. PATENT DOCUMENTS

| | | | |
|---|---|---|---|
| 5,025,124 A | 6/1991 | Alfredeen | |
| 6,362,462 B1* | 3/2002 | Merrell | C21D 9/30 219/676 |
| 6,859,125 B2 | 2/2005 | Rudnev et al. | |
| 2006/0124632 A1 | 6/2006 | Stuehr et al. | |
| 2009/0308501 A1 | 12/2009 | Illencik et al. | |
| 2010/0181305 A1 | 7/2010 | Doyon et al. | |
| 2011/0248023 A1* | 10/2011 | Doyon | C22C 37/00 219/635 |

OTHER PUBLICATIONS

Kiyoshi Funatani and George E. Totten, Heat Treating, Oct. 9-12, 2000, pp. 316-320, ASM International, Metals Park, OH (7 pages total).
The Timken Company, Maintenance Tools, 2007, USA (27 pages total).
Schaeffler Technologies AG & Co. KG, FAG Induction Heating Devices Heater, Jul. 2012, Germany (8 pages total).
SKF Group, SKF Induction Heaters, Jul. 2015 (8 pages total).
Simatec AG, Induction Heater IH 070, Switzerland (2 pages total).
Industrial Heating, Design and Development of PPAP-Ready Wheel-Bearing Inductors, May 2016, pp. 52-56 (6 pages total).
Collin Russell and Jeff Elinski, Metallurgical and mechanical implications of inductor and process design factors in induction heat treatment, 2016, pp. 71-84, vol. 11, Nos. 1/2, Int. J. Microstructure and Materials Properties.
The Timken Company, User Manual Induction Heaters, 2006, pp. 1-21, Europe.
SKF Group, Bearing Heaters, Jul. 2010 (6 pages total).

* cited by examiner

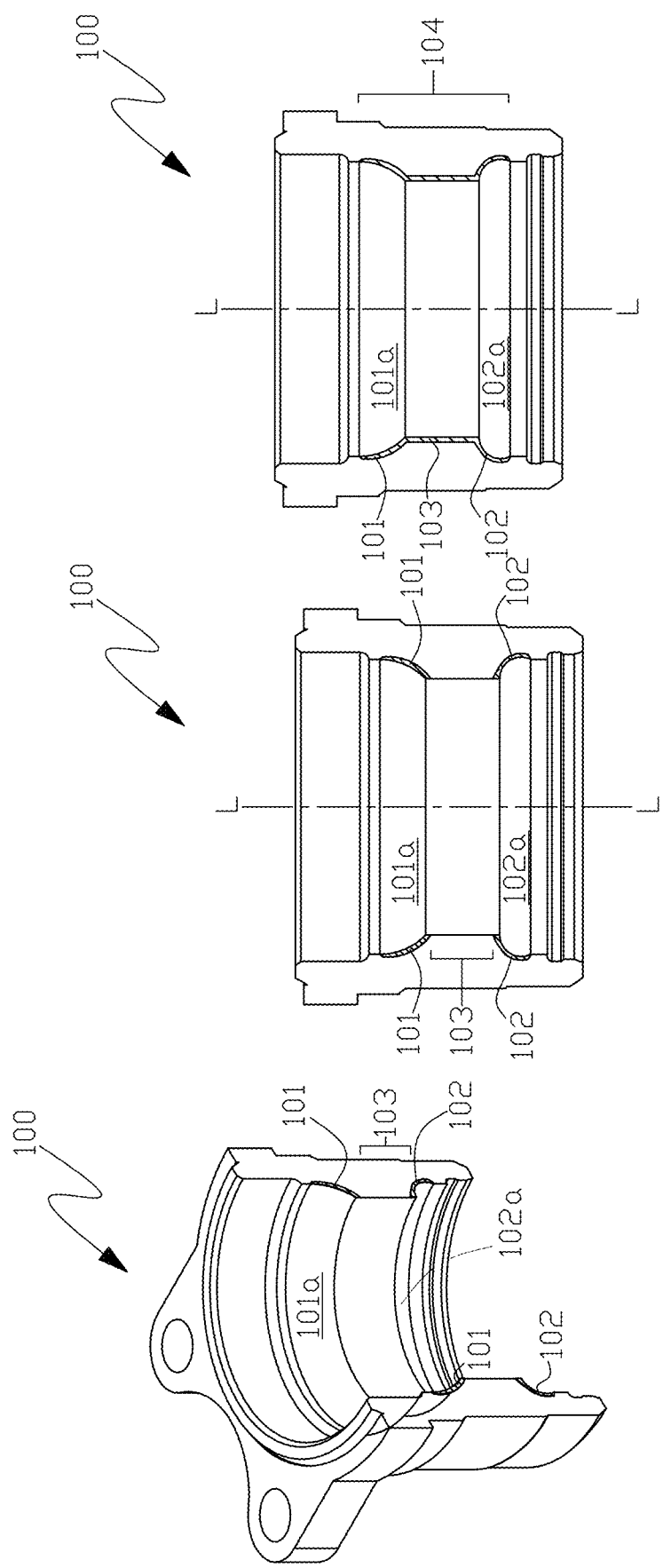

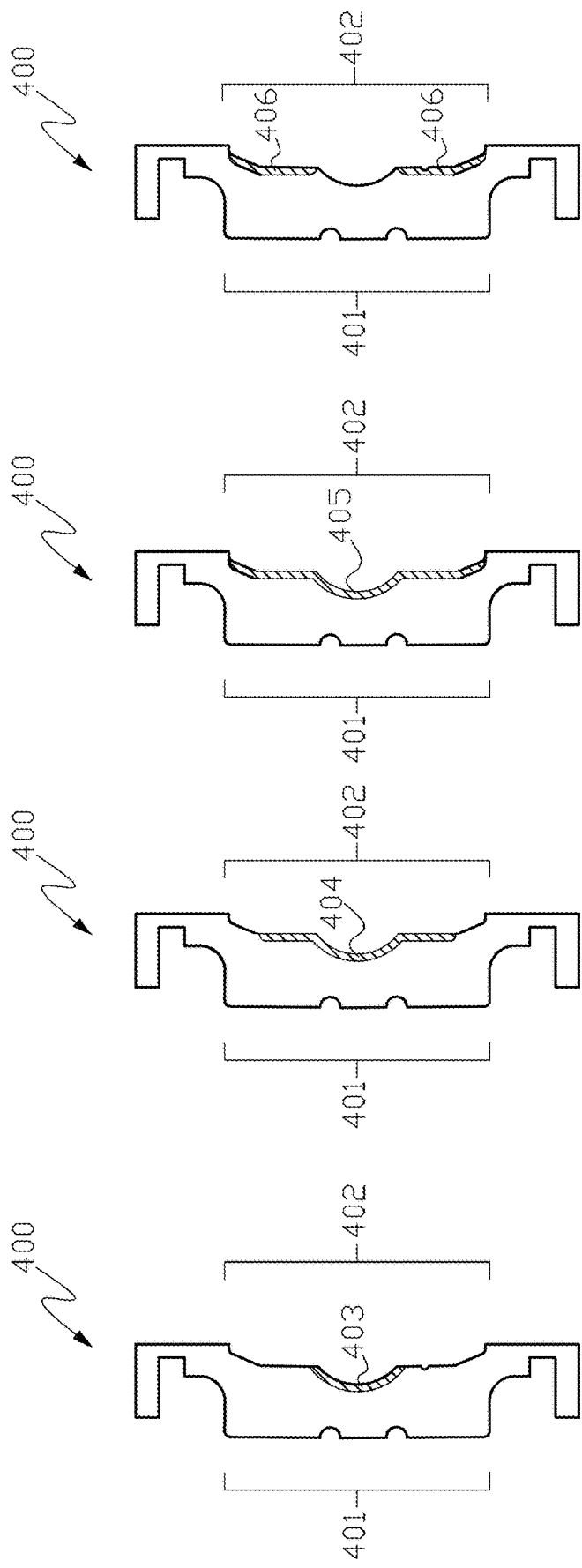

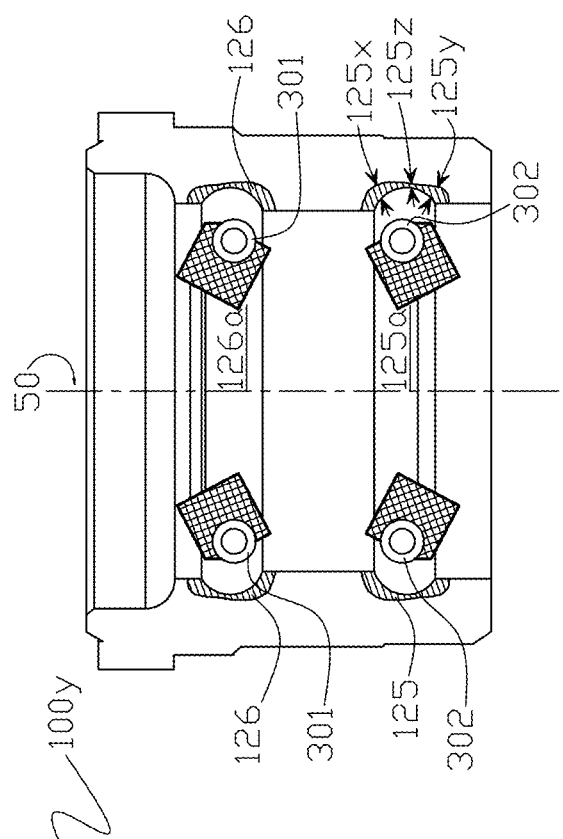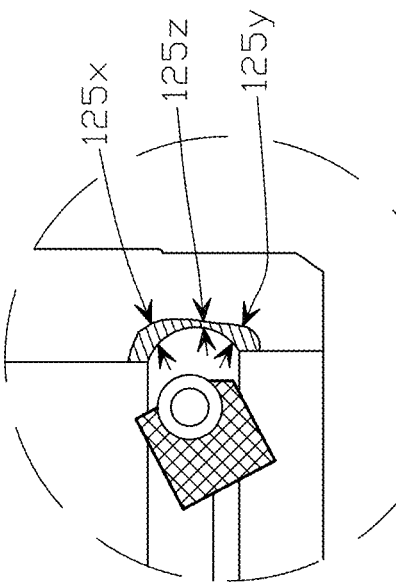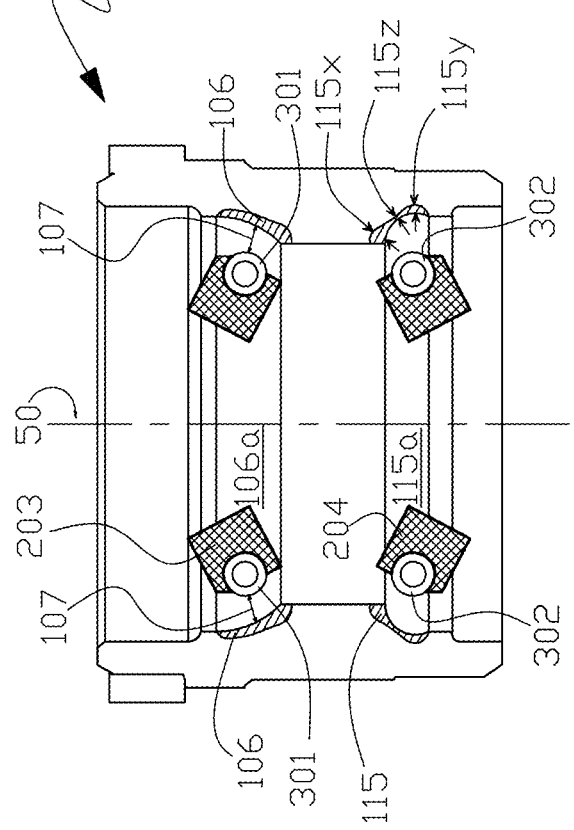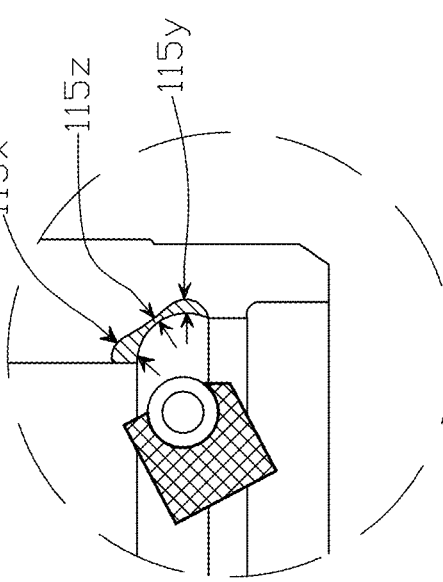

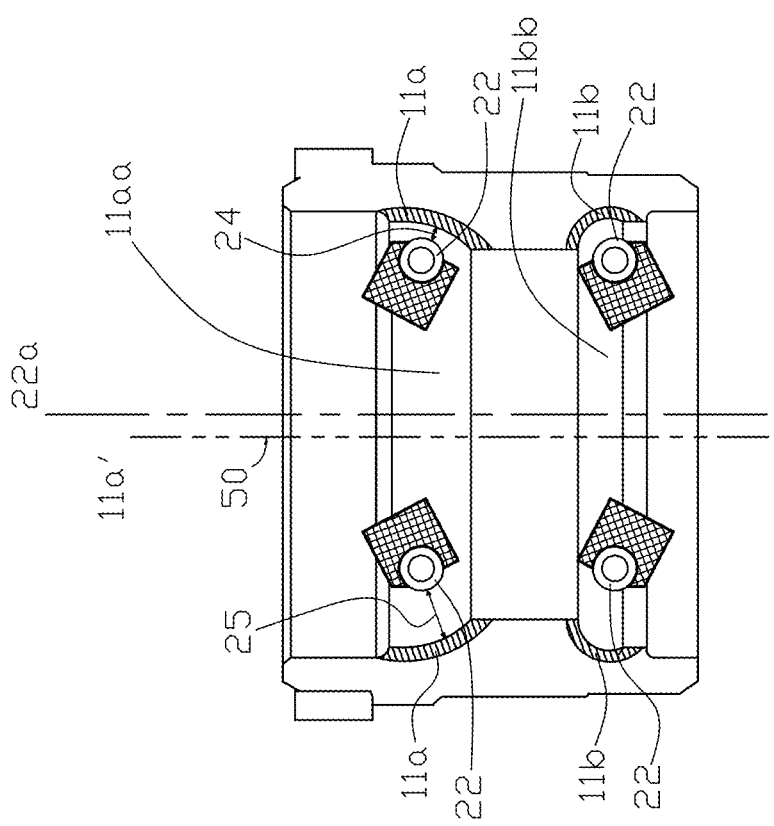

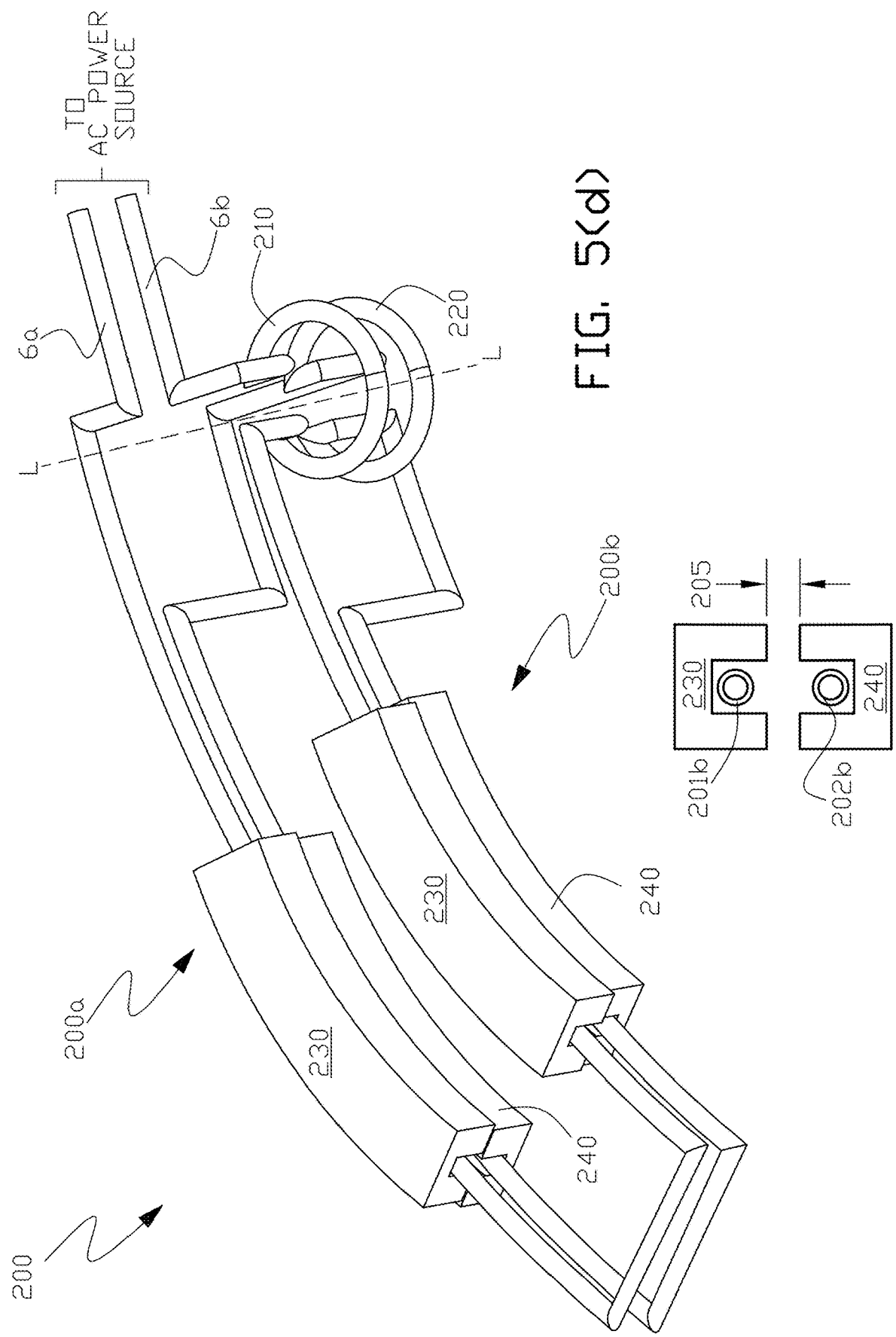

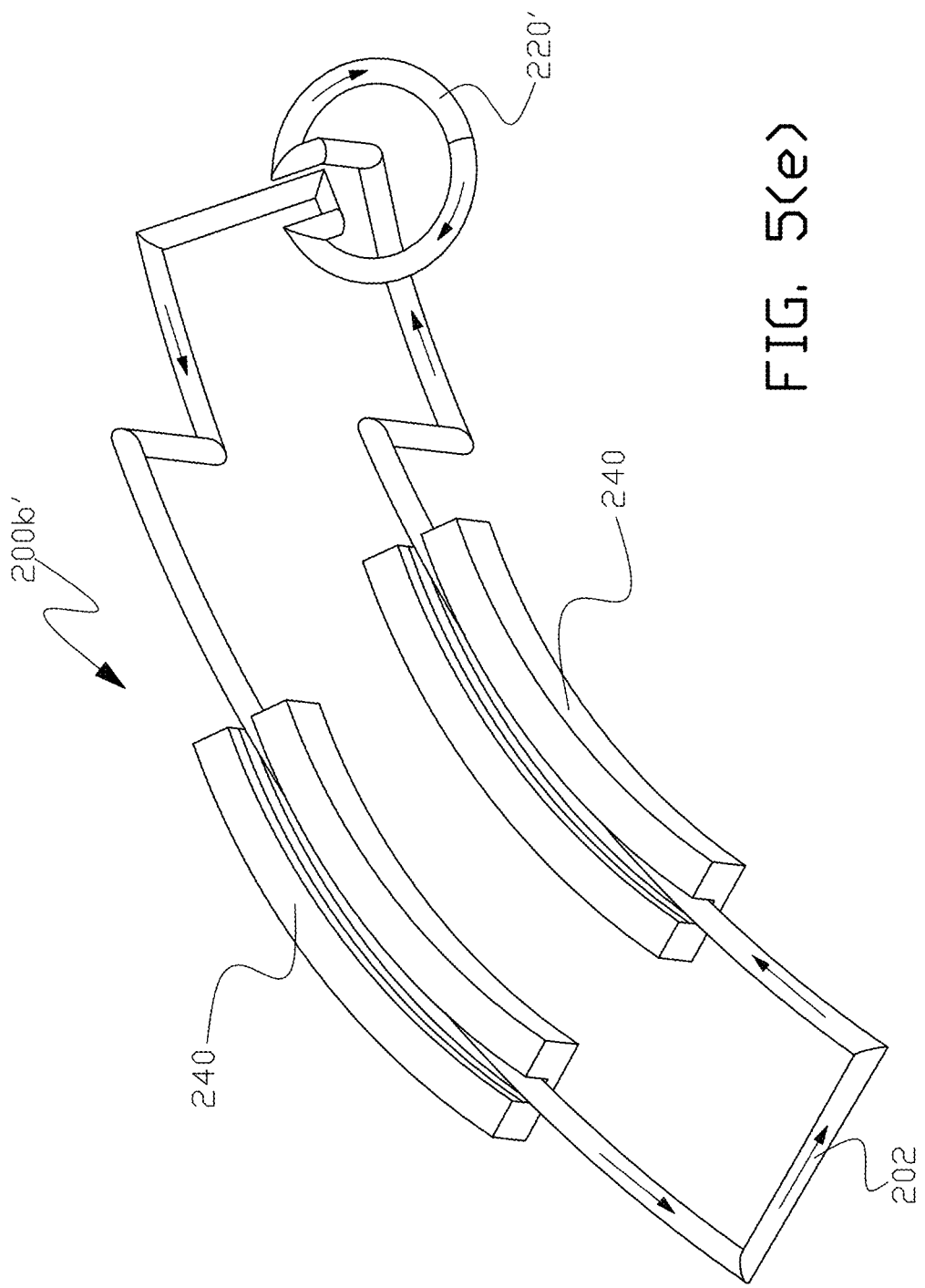

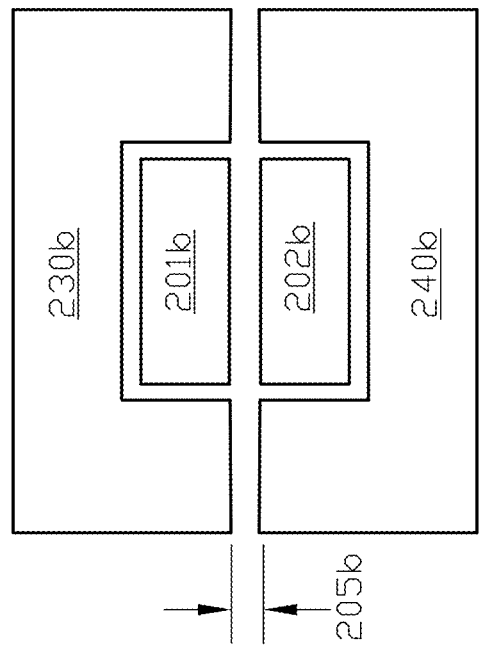
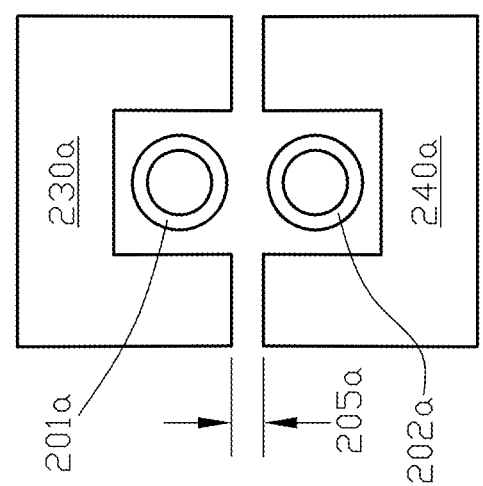
FIG. 7(b)
FIG. 7(a)

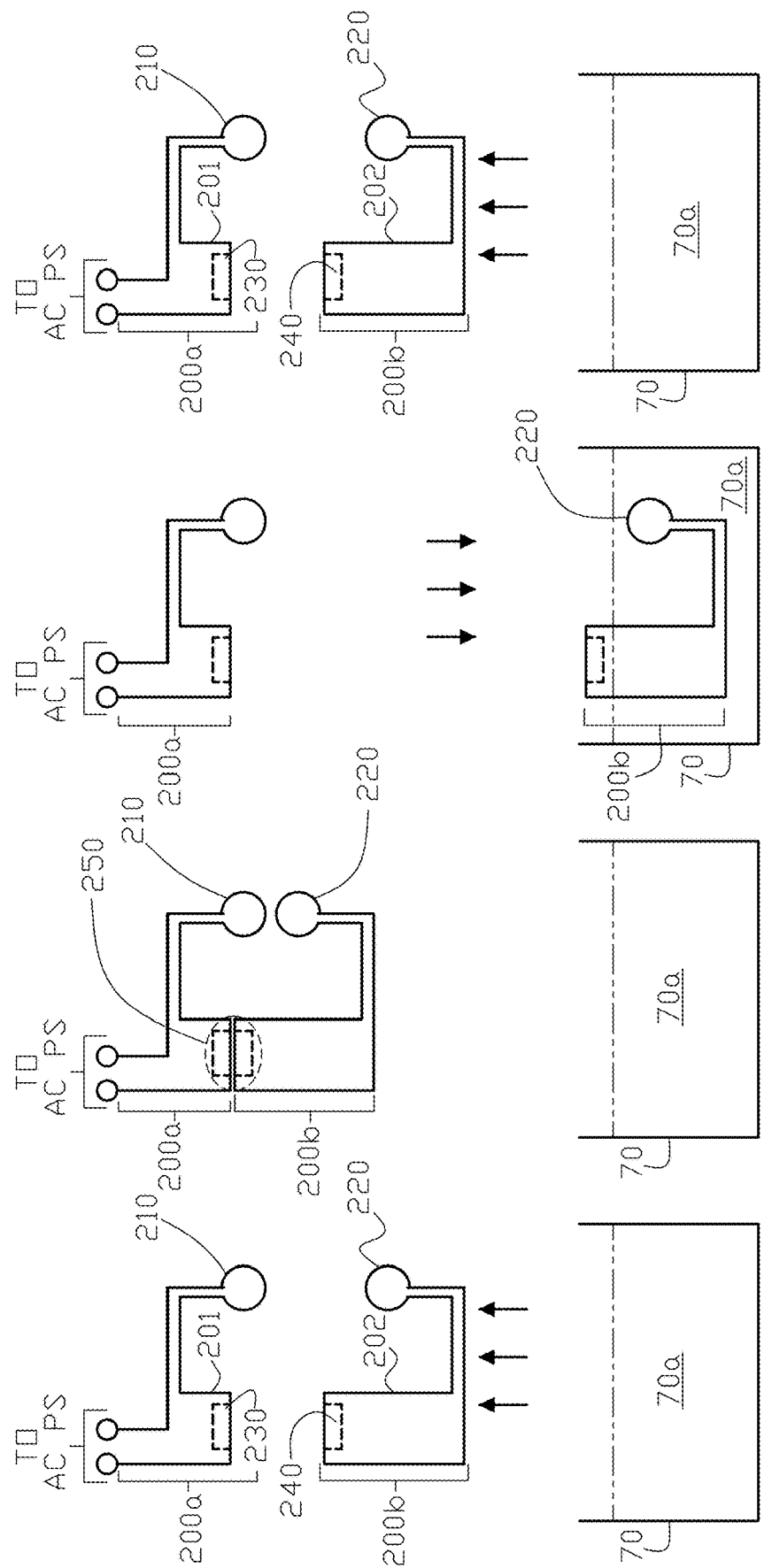

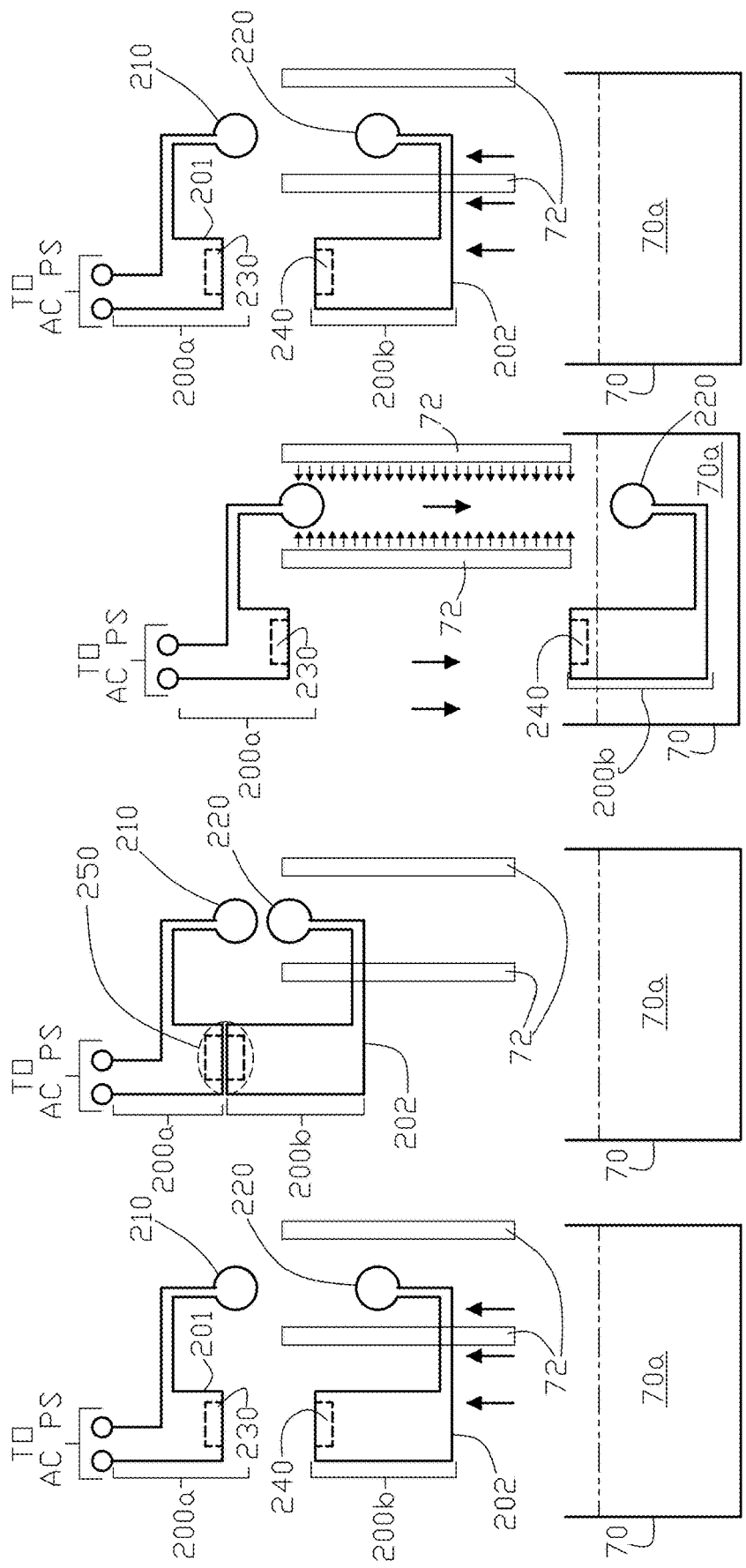

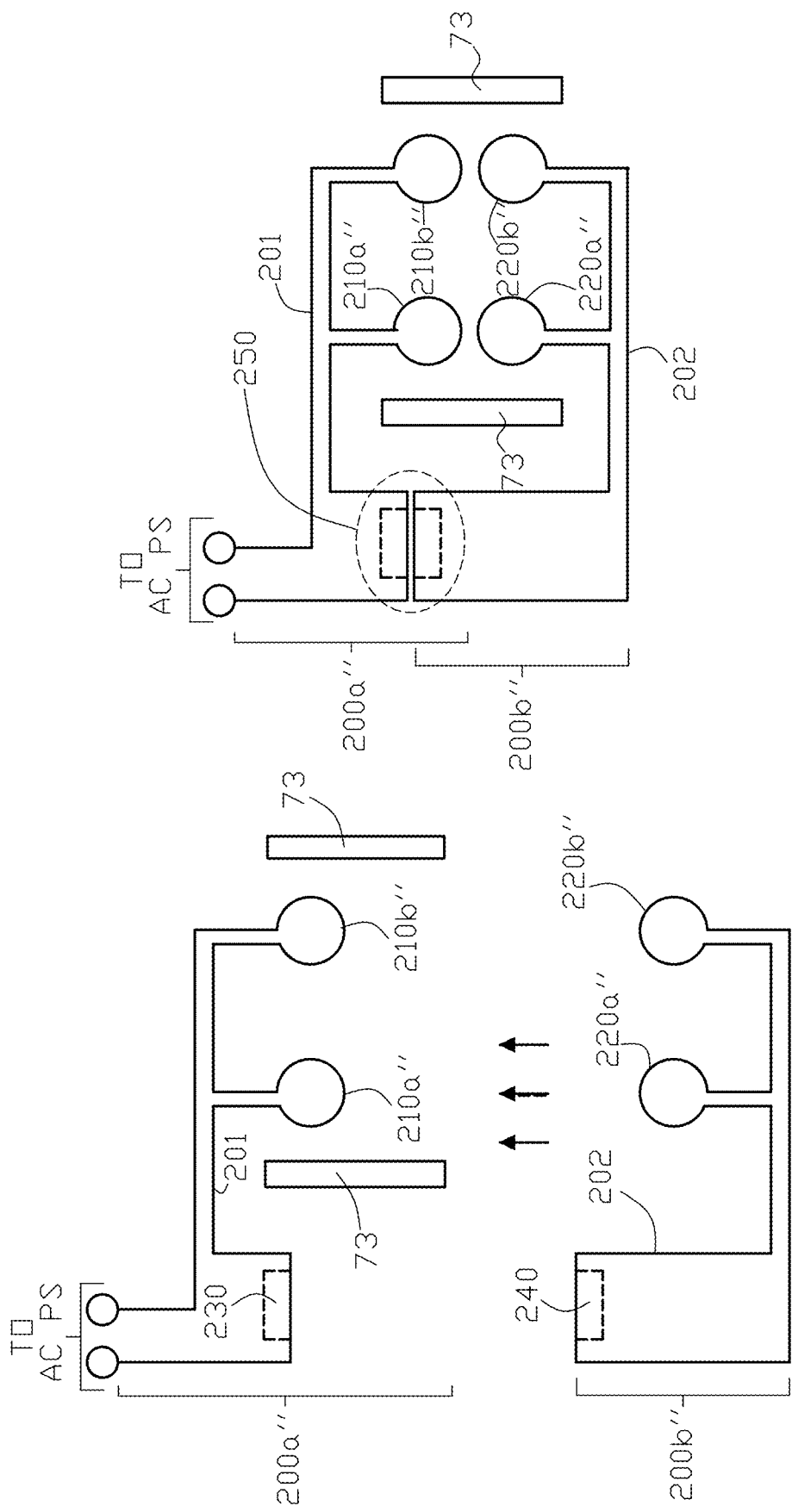

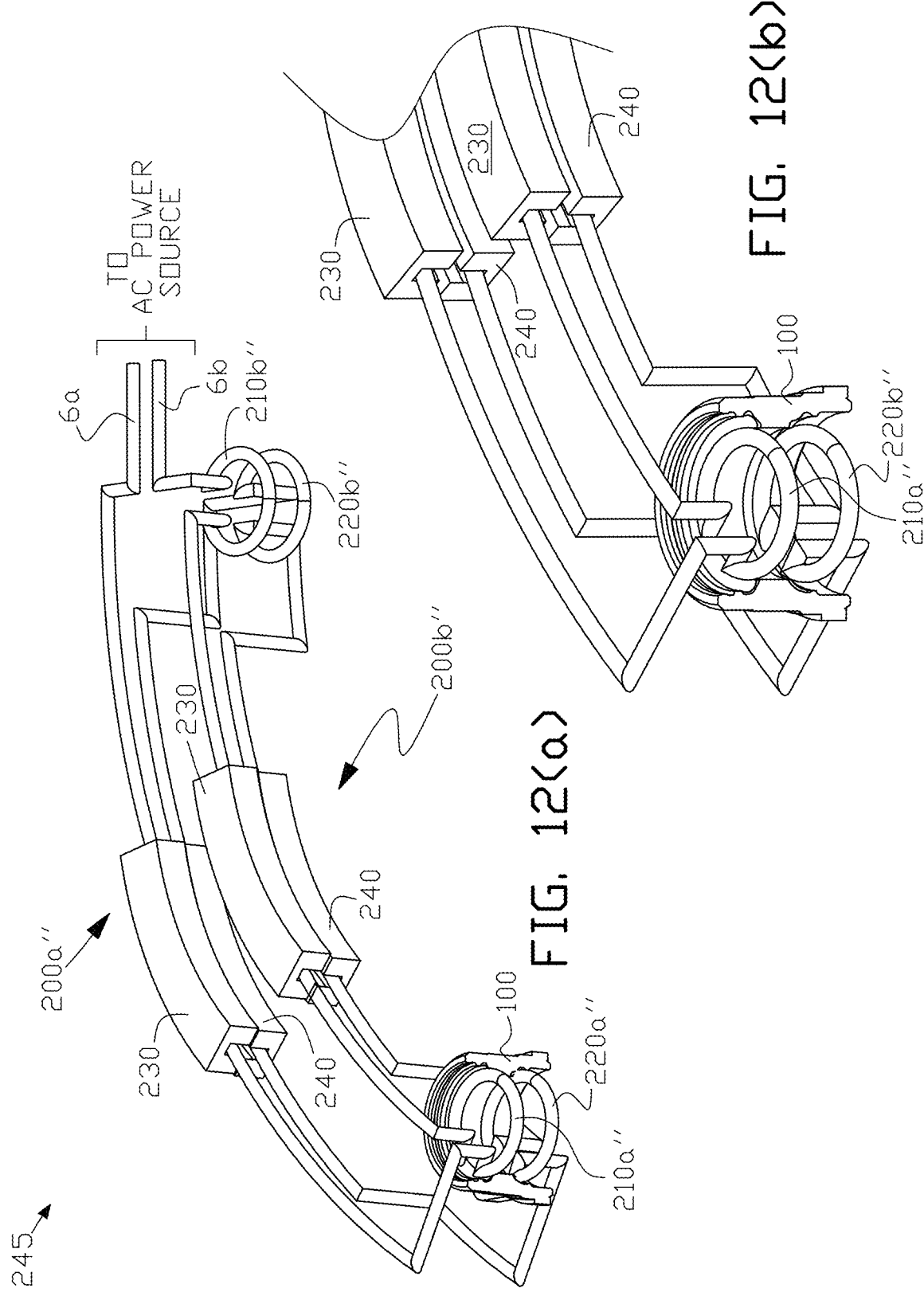

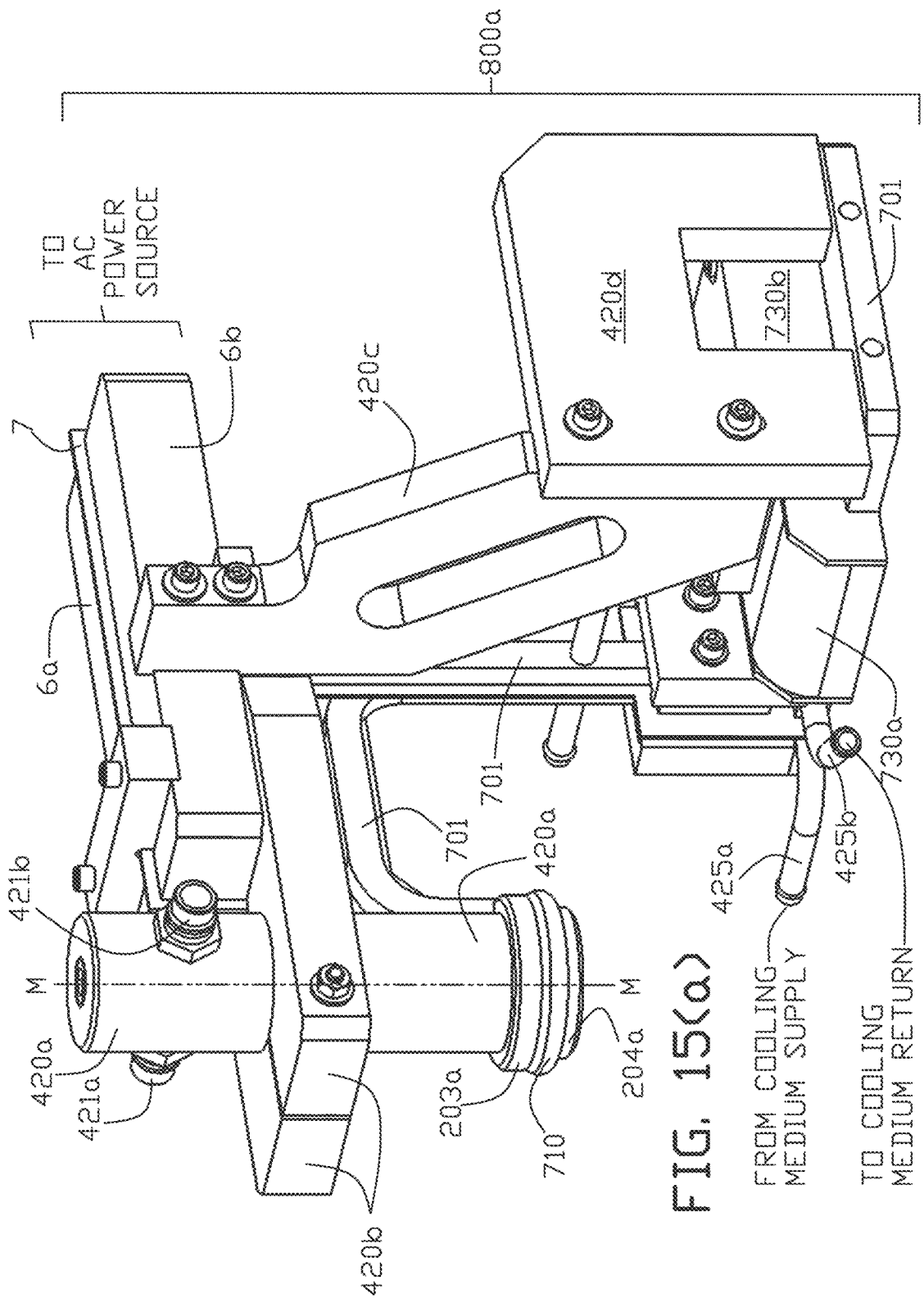

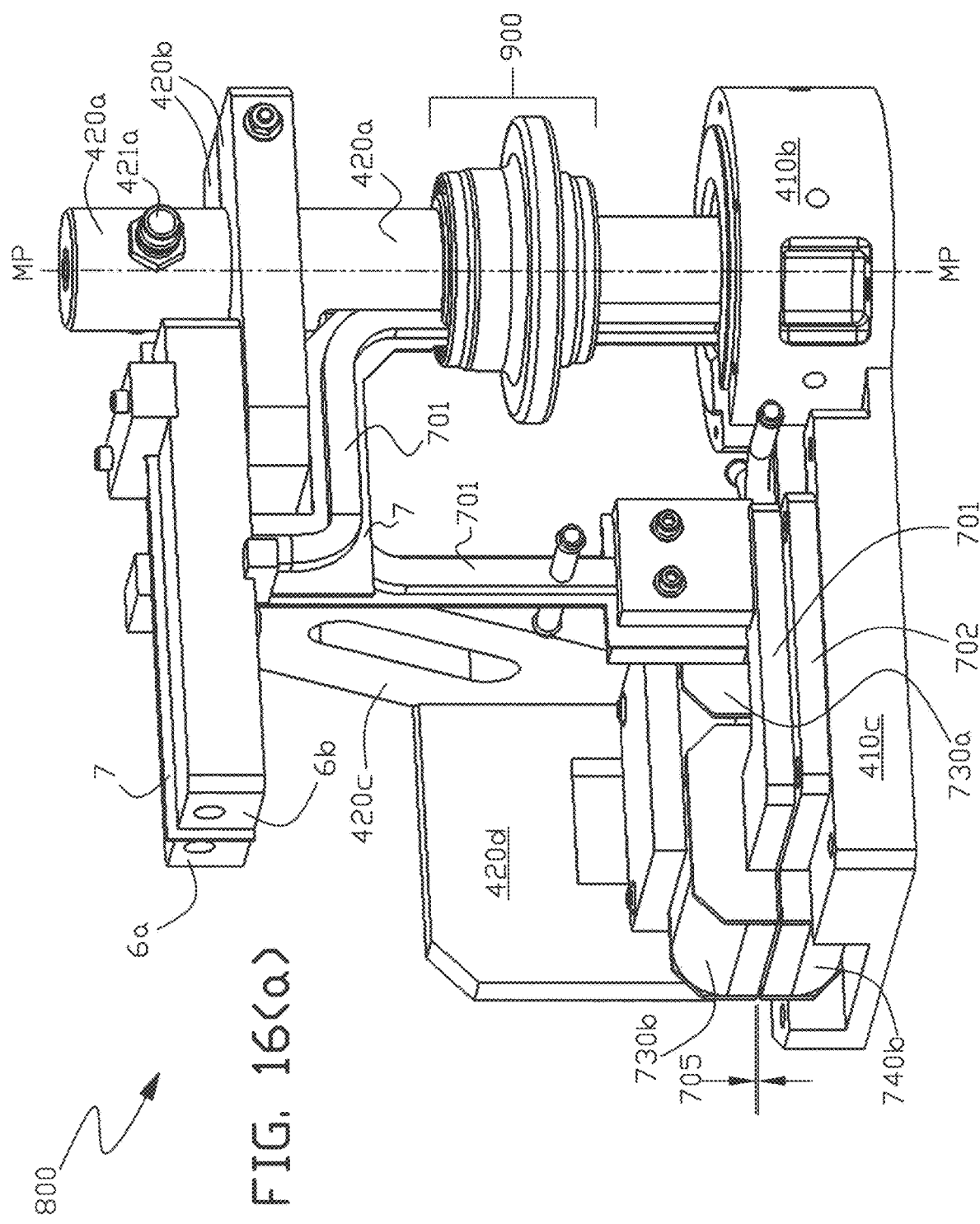

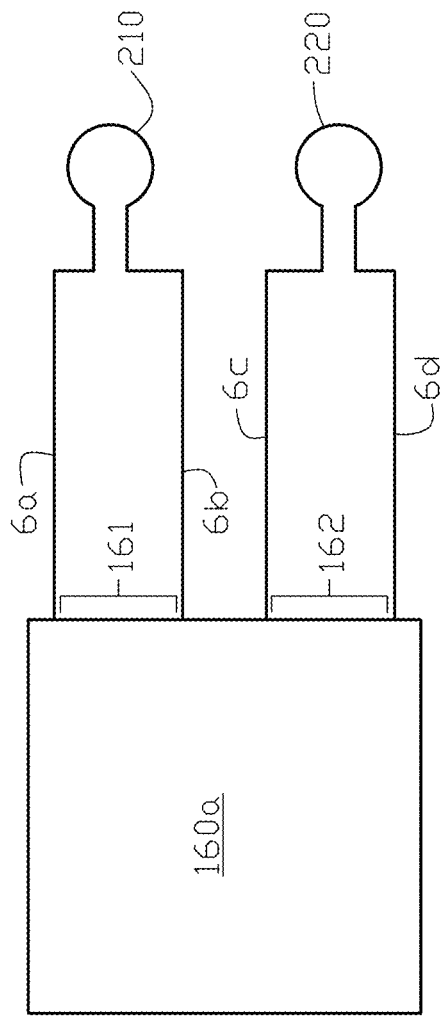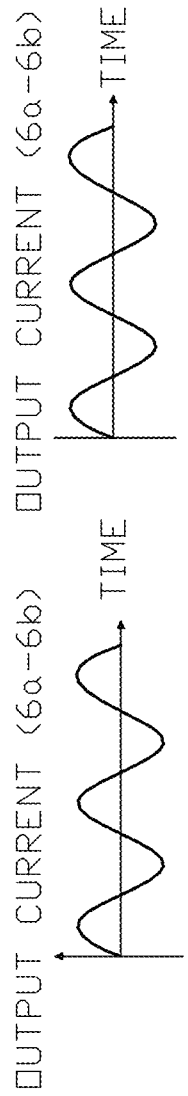

US 11,846,001 B2

SPLIT MULTIPLE COIL ELECTRIC INDUCTION HEAT TREATMENT SYSTEMS FOR SIMULTANEOUS HEATING OF MULTIPLE FEATURES OF A BEARING COMPONENT

CROSS REFERENCE TO RELATED APPLICATIONS

This application claims the benefit of U.S. Provisional Application No. 62/970,237, filed Feb. 5, 2020, hereby incorporated by reference in its entirety.

FIELD OF THE INVENTION

The present invention relates generally to electric induction heat treatment of bearing components with bearing features such as bearing races and raceways, and in particular to such heat treatment where a selected feature or features of the bearing races and raceways require metallurgical hardening.

BACKGROUND OF THE INVENTION

The present invention relates to electric induction heat treatment of inner or outer bearing races as well as raceways or other bearing features used, for example, in components of powertrains, drivelines and wheels. Bearings are critical machine elements that allow components to move with respect to each other. Depending upon a specific application, there are a number of variations of bearing race designs with many of the designs being standardized. This includes, but is not limited to, radial ball and roller bearings, and thrust ball and roller bearings. There are also single-row and multiple-row bearings, as well as single and double direction bearing designs. Regardless of the design specifics, the bearing contact working surfaces need to be treated to assure their wear resistance and strength over the lifetime of the bearing, as well as some assuring other mechanical properties, and electric induction hardening is one of the most popular methods of such heat treatment.

FIG. 1(a) illustrates in cross sectional perspective view one type of configured inner bearing race of bearing component 100 that is commonly used in the automotive industry. Various steel grades are used for the fabrication of the majority of forged bearing races. In less frequent applications, powder metallurgy materials and cast irons are also used. Bearing races can also be produced by an additive manufacturing technique, for example, a 3D printing process.

FIG. 1(b) and FIG. 1(c) illustrate in planar elevation cross section two alternative examples of induction surface hardness patterns of configured inner bearing race of bearing component 100. FIG. 1(b) shows an interrupted bearing race hardness pattern which contains two circumferential metallurgically hardened zones 101 and 102 (regions shaded in solid black or cross hatch) that are vertically separated by non-hardened circumferential region 103 as also shown in FIG. 1(a) and FIG. 1(b). Hardened zones 101 and 102 are bearing features or regions where rolling elements (for example balls or rollers) ride against inner bearing races 101a and 102a respectively. Depending upon the particular application, the geometries of zones 101 and 102 can be identical or different. The hardness pattern shown in FIG. 1(b) is the most popular pattern since it provides needed mechanical properties of bearing contact surfaces where they are needed without hardening a region, such as region 103, where no contact wearing occurs. Hardening only bearing features or regions 101 and 102 helps not only to provide needed engineering properties and minimized distortion characteristics after heat treatment, but also reduces the required amount of electrical energy for heat treatment.

FIG. 1(c) illustrates an alternative type of hardness pattern 104 (region shaded in solid black or cross section) that is used in some specific applications. In this type of hardness pattern, in addition to the inner bearing contact surfaces (bearing features or regions 101a and 102a) being induction hardened, region 103, which separates the inner bearing contact surfaces, is also induction hardened. Pattern 104 is usually associated with at least two undesirable workpiece and process factors: excessive distortion characteristics and appreciably increased electrical energy required for hardening all three regions, that is regions 101, 102 and 103. These are some of the reasons why the hardness pattern shown on FIG. 1(b) is the most popular pattern in contrast to the hardness pattern shown on FIG. 1(c).

In order to inductively heat treat bearing races, in some processes, an induction heating coil moves into a heating position (method A); however in other processes, an induction heating coil is static and a bearing race (that is, bearing component (workpiece) bearing feature or region to be heat treated) is moved into a heating position (method B). The invention disclosed herein can be utilized in heat treatment apparatus and processes for either method A or method B or a combination of method A and B where the induction heating coil and bearing race move relative to each other.

Conventional single-turn or multi-turn solenoid-type coils (for example, conventional prior art two-turn coils) are commonly used for heat treating surfaces of bearing races. An induction coil is positioned outside of the bearing race (in a configuration encircling the bearing race) for heat treating the outside surfaces of the race. An induction coil is positioned inside of the bearing race for heat treating its inner (interior) bearing surfaces. For convenience, the present invention is generally described herein for induction hardening (heat treatment) of inner bearing features such as bearing races and raceways but is also applicable to heat treatment of the external bearing features or surfaces of bearing components. For example FIG. 1(d) and FIG. 1(e) illustrate representative perspective views of a typically configured bearing race component 100' where the outer (external) surface 100'a is required to be hardened. FIG. 1(f), FIG. 1(g), FIG. 1(h) and FIG. 1(i) illustrate planar cross-sections of configured outer bearing race of bearing component 400 having inner surface region 401 that is not required to be induction hardened and bearing feature or region comprising outer (external) surface 402 that must be induction hardened. Depending upon a particular application, an entire area of outer (external) surface 402 as shown (in cross hatched region 405) in FIG. 1(h) may require induction surface hardening; alternatively selective bearing features or regions (each selective region shaded in cross hatching), for example selective region 403 shown in FIG. 1(f); selective region 404 shown in FIG. 1(g) or previously mentioned selective region 405 shown in FIG. 1(h), and selective regions 406 in FIG. 1(i) may require induction surface hardening. Hardness pattern shown on FIG. 1(i) represents and example of an interrupted hardness pattern.

The effectiveness of an internal cylindrical induction coil depends to a much greater extent on the coil-to-workpiece (bearing feature to be hardened) magnetic field coupling gap, compared with similar coils used for heating external surfaces (or outside diameters) of a bearing. The electrical efficiency of an internal coil rapidly decreases with an increase in the field coupling gap. Therefore, in order to increase heating electrical efficiency and minimize energy consumption, it is imperative to keep the coil-to-workpiece field coupling gap as small as possible.

The reason why solenoid-type inductors for heating inner (interior) surfaces are not as efficient as similar inductors (also referred to as a coil or induction coil) used for heating outer (external) surfaces of a bearing is related to the electromagnetic ring effect. According to the electromagnetic ring effect, the coil current is concentrated on the inside diameter of the solenoidal type of coil that represents a low impedance path as further described, for example, in section 3.1.5 of the Handbook of Induction Heating (second edition; CRC Press; Boca Raton, Fla., United States). When heating inner (interior) diameter surfaces, the inside diameter of the coil is the region farthest from the heated inner diameter surfaces. As a result, the electromagnetic coupling between the coil and the heated workpiece (that is, the bearing feature to be heated) is greater than the actual air gap between the inner (interior) diameters of the workpiece and the outside diameter of the induction coil. This makes for poor coil-to-workpiece field coupling (also referred to as spatial proximity) and therefore, causes a noticeable reduction in coil efficiency.

Installation of a magnetic flux concentrator inside of the internal inductor is frequently mandated to increase the coil electrical efficiency and reduce the coil current, particularly for heating internal surfaces of small to moderate diameters. The flux concentrator creates an electromagnetic slot effect that has a substantially stronger impact on the coil current distribution than the electromagnetic ring effect and forces the coil current to be shifted toward the coil outside regions to be positioned closer to the surface of the heated workpiece. This increases the magnetic field strength and heat intensity at the (bearing component) workpiece's internal surfaces required to be heated.

In order to minimize a distortion after induction heat treatment and achieving heat treatment properties for long-lasting service life of bearing races, it is important that the heat treatment process achieves sufficient minimal hardness case depth, but avoids: (1) causing excessively deep localized case depths; (2) too high temperatures during austenitization; and (3) disproportionally different hardness case depths within each of the bearing contact surfaces (for example in zones 101a and 102a for the configured inner bearing race in FIG. 1(b)). These heat treatment characteristics are some of the reasons why obtaining as close to uniform hardness patterns as possible within each of the bearing contact surface regions 101a and 102a are often highly desirable.

Several factors make it challenging to obtain sufficiently uniform hardness patterns in bearing features or regions 101a and 102a. The first factor is associated with a complexity of the (bearing component) workpiece's geometry, for example the workpiece geometries in FIG. 1(a) to FIG. 1(c). Corner regions that have tendency to attract magnetic fields due to the electromagnetic edge effect may produce deeper hardness case depths. Besides that, there are appreciably different masses of metal forming the workpiece (that is, the bearing component) in proximity to bearing features comprising surface regions 101a and 102a, that produce appreciably different "cold sink" effects (axially and radially) of neighboring areas and result in a corresponding deviation of temperatures while induction surface hardening inner bearing races (regions 101a and 102a).

The second factor is related to the difficulty of using conventional single-turn or multi-turn solenoid-type coils (for example, prior art conventional two-turn coils) for obtaining contour-like hardness patterns. In order to locate a solenoid-style hardening coil into the heating position inside of the bearing race for hardening its inner surfaces in bearing features or regions 101 and 102 (shown for example, in FIG. 1(b)), there must be a sufficient clearance to pass the smallest diameter area (region 103 in FIG. 1(b)) during loading (to the heating position) and unloading (from the heating position of the bearing race in a solenoid-style induction hardening coil. This results in variable electromagnetic coupling (spatial proximity) between coil regions where electrical current flows and regions of the inner bearing races that produce a non-uniform hardness pattern.

FIG. 2(a) and FIG. 2(b) illustrate an example of the phenomenon of variable electromagnetic coupling with cross sectional views of an inner bearing race. In the example shown in these figures, copper tubing with a circular cross section (and coil turns 301 and 302) and hollow interior water cooling passages is used for the induction coil fabrication. In other embodiments, the induction coil can alternatively be formed: (1) by Computer Numerical Control (CNC) machining a solid copper block; (2) brazing suitable copper components together; or (3) die forming profiled heating faces of coil turns to accommodate the geometry of the inner bearing race regions 115a and 106a (FIG. 2(a)) and inner bearing race regions 125a and 126a (FIG. 2(b)). Conventional magnetic flux concentrators 203 and 204 can be used to improve heating efficiency and concentrate the magnetic field generated by each coil turn 301 and 302 of the two-turn coil formed from the copper tubing for heating inner bearing races (regions 115 and 106) in FIG. 2(a), and for heating inner bearing races (regions 125 and 126) in FIG. 2(b) of alternative geometries. Magnetic flux concentrators are normally fabricated from standard lamination packs, pure ferrites or conventional iron-based or ferrite-based powder materials containing pressed and/or sintered magnetic particles.

As shown on FIG. 2(a), coil turns 301 and 302 of the conventional prior art solenoid-style two-turn inductor copper tubing are respectively positioned to heat corresponding bearing features comprising surfaces (regions 115a and 106a) of configured inner bearing race on bearing component 100y. Axis of longitudinal symmetry 50 of configured inner bearing race component 100y coincides with the axis of longitudinal symmetry of the solenoid-type two-turn coil of copper tubing. In the example of FIG. 2(a), upper radial clearance 107 between the cross hatched hardened region 106 and tubing 301 is circumferentially the same (that is, when comparing radial clearances 107 on left and right cross sectional sides of the planar cross-section drawing shown in FIG. 2(a)). Sufficient radial clearance 107 allows safe movement of the workpiece (configured inner bearing races) in and out of a heating position where the workpiece is shown in the heating position in FIG. 2(a) or FIG. 2(b) while the two-turn coil is raised (and/or the inner bearing race is lowered) into the heating position.

The bearing race may be rotated (that is, spun) about its longitudinal axis of symmetry with a suitable prior art rotational apparatus (not shown in the drawings) during the heating and quenching cycles to even out the radial circumferential heated temperature distribution. Upon completion of the austenitization stage by induction heating, quenching can be performed in-place (in the heating position), for example with a spray quench apparatus known in the art, to quench out the austenitized regions and form the requisite martensitic structures. In other processes, quenching can be done out-of-place (that is, out of the heating position) in a separate quench location (for example, with the heated workpiece (bearing component) moved to a position vertically above or below the heating position). The quenching process step can be accomplished with quenching apparatus known in the art.

As can be seen from FIG. 2(a), due to the differences in spatial proximity (electromagnetic coupling) between current carrying face of the coil and various regions of the lower inner bearing race surface, there will be appreciable non-uniform heating distribution due to the difference in application of the electromagnetic proximity effect. Upon quenching, this produces corresponding non-uniform hardening patterns in regions 115 and 125. In some applications, a non-uniform hardening pattern manifests itself in gradually reduced hardness case depth. In other applications, instead of gradual change in the hardness pattern of a region, there are wave-like hardness pattern regions exhibiting a combination of deeper or shallower hardness case depths. For example, regions 115 and 125 exhibit deeper hardness case depth in localized regions $115x$ and $115y$ in FIG. 2(a) (and enlarged partial view in FIG. 2(c)) and in localized regions $125x$ and $125y$ in FIG. 2(b) (and enlarged partial view in FIG. 2(d)). Conversely regions 115 and 125 exhibit shallower hardness case depths in localized region $115z$ in FIG. 2(a) (and enlarged partial view in FIG. 2(c)) and in localized region $125z$ in FIG. 2(b) (and enlarged partial view in FIG. 2(d)). An attempt assuring minimal required case depth in regions of the inner bearing races where it is difficult to generate sufficient heat sources might inevitably be associated with a necessity to severely overheat neighboring localized bearing race regions, which negatively affects metallurgical characteristics of as-hardened regions and engineering properties of the bearing races; thus overheating should be avoided. However, conventionally designed electrical coils might inevitably be associated with a formation of non-uniform hardness patterns and excessive localized heat generation.

FIG. 3(a) through FIG. 3(c) and FIG. 4 are diagrammatic illustrations of alternative prior art configurations of induction coils that can be used for induction heat treating inner bearing races. FIG. 3(a) shows a diagrammatic top view of a workpiece (configured inner bearing race) loading (to a heating position) and unloading (from the heating position) arrangement of a prior art conventional solenoidal-type inductor similar to the arrangement illustrated on FIG. 2(a) and FIG. 2(b) and discussed above. In FIG. 3(a) and FIG. 3(b) the dashed circle diagrammatically represents the inner circumferential boundary of inner bearing race 11a and the solid circle represents the current carrying face of coil 22 facing the inner circumferential boundary of the inner bearing race as shown in cross sectional view in FIG. 3(c).

During a workpiece loading operation to the heating position, axis of rotational longitudinal symmetry 11a' of the configured inner bearing race 11a coincides with the axis of longitudinal symmetry 22a of solenoid-type induction coil 22 to form circumferentially uniform gap 23 (FIG. 3(a)) between the configured inner bearing race 11a and induction coil 22. Prior to start of the heating process step of the heat treatment process, the workpiece or induction coil, or both the workpiece and the induction coil, are moved in a radial direction (perpendicular to the inner bearing race and induction coil axes of longitudinal symmetry) resulting in smaller gap 24 on the right side and in larger gap 25 on the opposite left side as shown in FIG. 3(b) between the inner bearing race and the induction coil. As a result of this movement, improved electromagnetic coupling between the inner bearing race and coil is provided in smaller gap 24 compared to having uniform gap 23 and concentrated heating occurs in bearing race regions around this smaller gap; otherwise there would be a deficit of heat generation in these bearing race regions due to poor electromagnetic proximity. However, upon this movement, an opposite side will exhibit enlarged gap 25. Therefore in this method, gap 24 is less than gap 25, which helps produce a more uniform hardening pattern within the bearing race region as shown in FIG. 3(c) at the expense of producing poor electromagnetic coupling in larger gap 25 at the opposite horizontal region of the bearing race. The configured inner bearing race is rotated (that is, spun with rotational apparatus) during the heating process step in the heat treatment process with conventional rotational apparatus to even out circumferential temperature distribution regions 11aa and 11bb. Upon completion of the austenitization step in the heat treatment process, quenching (with conventional quenching apparatus) can be applied in-place (that is, in the heating position) to quench out austenitized regions and form the required martensitic structures. In other heat treatment processes, quenching can be done out-of-place (that is, with the heated workpiece moved out of the heating position) in a dedicated quenching location; for example, in a quench tank that can be situated below the heating position for lowering of the heated workpiece into the tank, or in a spray quench apparatus positioned in close proximity to the heating position to which the heated workpiece can be transferred to with, for example, suitable electromechanical transfer apparatus.

Unfortunately the heating method and apparatus illustrated in FIG. 3(a), FIG. 3(b) and FIG. 3(c) is not free from shortcomings. One shortcoming is associated with the necessity to have at least vertical movement of components (for example, during workpiece loading to the heating position and unloading from the heating position) and radial movement (perpendicular to vertical movement). Thus auxiliary electromechanical transfer apparatus for vertical movement and radial movement is required which results in additional costs and complexity for the heat treatment system. Additionally improved spatial proximity (and resulting improved electromagnetic coupling) on one side with smaller gap 24 is associated with deteriorated electromagnetic coupling on the opposite side with larger gap 25 that worsens heat treatment process sensitivity (with potential hardness pattern deviations) and reduces electrical efficiency of workpiece heating.

FIG. 4 is a diagrammatic illustration of an alternative prior art induction coil (inductor). In FIG. 4 an arc-shaped inductor 40 (also known as a hairpin inductor in the art) is shown in three interconnected segments shown in cross hatch. Inductor 40 comprises: heating segment 41; return current segment 43; and interconnection segment 42. Magnetic flux concentrator 44 (shown in stipple shading) is positioned between heating segment 41 and return current segment 43. All three inductor segments are arranged electrically in series and connected to an alternating current power source (AC PS in the figure). Magnetic flux concentrator 44 provides electromagnetic decoupling between heating segment 41 and return current segment 43 to shift the maximum density of electrical current flowing in heating segment 41 towards the heating segment's external surface 41a that would face the configured inner bearing race region (not shown in the figure) required to be heated when the inner bearing race is in the heating position. The design of the hairpin inductor 40 shown in FIG. 4 improves electromagnetic coupling between the inductor and the workpiece's inner bearing race, and in some applications simplifies achieving a required hardness pattern. The workpiece (that is, the bearing component with the bearing feature of the inner bearing race) is rotated during the heating process steps and quenching process steps to even out the circumferential temperature distribution around the inner bearing race.

Arc-shaped inductor 40 provides certain process flexibility. However, it is not free from known drawbacks of previous designs illustrated, for example in FIG. 3(a) to FIG. 3(c), which includes low energy efficiency and the necessity for the induction heating apparatus to be capable of providing two motions (vertical movement and radial movement) in order to have a sufficiently close coil-to-bearing race positioning during the heating process steps without obstructing complex geometries such as region 103 in the inner bearing race for the configured inner bearing race component 100 shown in FIG. 1(b). Additionally a magnetic flux concentrator 44 (FIG. 4) that is inserted (sandwiched) between two coil segments 41 and 43 that carry electrical current flowing in opposite directions can act as an electrical load having a tendency to magnetically saturate and become overheated which will reduce the overall reliability of induction heating system.

In view of the prior art it is one object of the present invention to provide an electric induction heating system and method that provides closer electromagnetic coupling gaps between the induction heating coil and a bearing component's bearing feature such as a bearing raceway surface region when in a heating position for metallurgically hardening in an induction heating application that will result in high energy efficiency and superior hardness pattern control than in the prior art.

It is another object of the present invention to provide an electric induction heating system and method with contour-like hardening patterns in bearing features, including inner and outer bearing races, with minimal size and shape distortion and reduced maximum and peak temperatures during austenitization process steps to produce metallurgically sound microstructures with reduced probability of cracking of the bearing races during the heat treatment process.

It is another object of the present invention to provide an electric induction heating system and method that provides for simultaneous heat treatment of multiple bearing features on a bearing component where different geometries of the multiple bearing features and the bearing component do not accommodate placement of the multiple bearing features adjacent to a single induction coil for efficient simultaneous heat treatment of the multiple bearing features and/or multiple bearing components.

BRIEF SUMMARY OF THE INVENTION

In one aspect the present invention is an electric induction heat treatment apparatus and method for metallurgically hardening one or more selected bearing features of a bearing workpiece, for example, a region or regions of an inner or outer bearing race, with a combination master inductor circuit connected to an alternating current power source and a passive inductor circuit where the combination of the master and passive circuits are electromagnetically coupled to each other without physical and electrical connection to form at least one pair of complementary master inductor coil and passive inductor coil that the selected bearing features are positioned around so that the selected bearing features couple with the magnetic flux field created by the complementary coil pair to inductively heat to austenitization the selected bearing features with subsequent quenching to transform the metallurgical properties of the austenitized selected features.

In another aspect the present invention comprises a bearing workpiece electric induction heat treatment apparatus and method wherein a bearing workpiece has at least two bearing features for metallurgical heat treatment that in some embodiments of the invention are separated from each other by a non-heat treated bearing feature. In some embodiments of the invention a bearing workpiece with a single bearing feature is metallurgically heat treated, for example, the bearing workpiece in FIG. 1(c) with a single continuous bearing feature. The apparatus and method comprises a master inductor circuit and a passive inductor circuit with the master inductor circuit and the passive inductor circuit physically separated from each other and without a physical electrical connection between them. The master inductor circuit is supplied with a master circuit alternating current from a power source to a master inductor circuit conductor network having at least one master heating inductor configured for a first bearing feature induction heating prior to a quench of the bearing workpiece and a master circuit electromagnetic coupler. The passive inductor circuit comprises a passive inductor circuit conductor network having at least one passive heating inductor configured for a second bearing feature induction heating prior to the quench of the bearing workpiece and a passive circuit electromagnetic coupler. The master inductor circuit and the passive inductor circuit are moved into a workpiece heating position adjacent to each other. In one process application of the present invention with the master inductor circuit and the passive inductor circuit in the workpiece heating position, the at least one master heating inductor and the at least one passive heating inductor are respectively configured for the simultaneous induction heating of the first bearing feature by a master circuit flow of the master circuit alternating current and second bearing feature by a passive circuit current flow induced by a magnetic flux coupling of the master circuit alternating current between the master circuit electromagnetic coupler and the passive circuit electromagnetic coupler.

Subsequent to completion of the induction heating of the at least one first bearing feature and the at least one second bearing feature, the bearing workpiece is quenched as required by a particular application, for example, either alternatively in the workpiece heating position with a quench apparatus integrated with the at least one master heating inductor, the at least one passive heating inductor, the at least one master and passive heating inductors, or a quench apparatus disposed at one or more quench apparatus locations remote from the workpiece heating position.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims.

FIG. 1(a) is a side perspective cross sectional view of one type of bearing feature, namely a configured inner bearing race in a bearing component described as bearing workpiece 100 that is commonly used in heavy duty bearings for automotive powertrains and drivetrains, and other heavy duty applications.

FIG. 1(b) is an elevational cross sectional view of the configured inner bearing race in bearing workpiece 100 in FIG. 1(a) illustrating a longitudinally (along longitudinal axis L) interrupted hardness pattern, which contains two circumferentially hardened longitudinal zones (or regions) 101 and 102 separated by a circumferential non-hardened longitudinal region 103.

FIG. 1(c) is an elevational cross sectional view of a configured inner bearing race in bearing workpiece 100 illustrating a circumferentially non-interrupted longitudinal hardness 104 that is an alternative to the longitudinally interrupted hardness pattern in FIG. 1(b). In FIG. 1(c) the bearing features, namely configured inner bearing race zones 101 and 102 (that is, the bearing roller contact surfaces) are induction hardened along with the circumferential longitudinal region 103 between the inner bearing race zones.

FIG. 1(f), FIG. 1(g), FIG. 1(h) and FIG. 1(i) are cross sectional views of a configured outer bearing race of bearing component 400 illustrating four alternative hardness patterns (zones or regions) 403, 404, 405 and 406 (shown in crosshatch) that can be formed in alternative electric induction hardening processes as may be required for alternative applications.

FIG. 2(a) is a cross sectional view of a configured inner bearing race illustrating a variety of hardness patterns (in crosshatched zones 106 and 115) in a heating position with a prior art induction heating apparatus comprising a solenoid-style two-turn electrical heating inductor with coil turns 301 and 302 and associated flux concentrators 203 and 204. Coil turn 301 surrounds region 106 for heating and coil turn 302 surrounds region 115 for heating in FIG. 2(a). Each coil turn can be connected together in series or in parallel with alternating current supplied to the coil from a suitably connected power source with instantaneous current flowing in the same or reverse directions in the coil turns.

FIG. 2(b) is a cross sectional view of a configured inner bearing race illustrating alternative geometries of inner bearing races and hardness patterns (including crosshatched zones 125 and 126) from those in FIG. 2(a) in a heating position with a prior art induction heating apparatus comprising a solenoid-style two-turn electrical heating inductor with coil turns 301 and 302 and associated flux concentrators 203 and 204. Each coil turn can be connected together in series or in parallel with alternating current supplied from a suitably connected power source with alternate current flowing in the same or reverse directions in the coil turns.

FIG. 2(c) and FIG. 2(d) are enlarged illustrations of selected hardness patterns shown in FIG. 2(a) and FIG. 2(b) respectively.

FIG. 3(a) illustrates an example of "workpiece-to-coil" mutual positioning during the process step of loading bearing workpiece's inner bearing race 11a within inductor 22 with uniform circumferential clearance distance 23 between the inductor and the inner bearing race being heated. FIG. 3(b) illustrates an example of "workpiece-to-coil" mutual positioning during the process step of heating bearing workpiece's inner bearing race 11a within inductor 22 with non-uniform circumferential electromagnetic coupling distances 24 and 25. FIG. 3(c) illustrates the resulting circumferentially uniform hardness patterns 11aa and 11bb assuming sufficiently fast workpiece rotation (that is spinning) about axis 50 during induction heating with a conventional workpiece rotation apparatus (not shown in the drawing).

FIG. 5(a) through FIG. 5(d) illustrate diagrammatically one embodiment of an electric induction heating system of the present invention showing a master inductor circuit (FIG. 5(a)) and a passive inductor circuit (FIG. 5(b)). FIG. 5(c) and FIG. 5(d) are alternative perspective views of a master inductor circuit and a passive inductor circuit in a workpiece (bearing component) heating position. The inner bearing races (bearing features) and quenching apparatus are not shown for clarity. Arrows indicate relative instantaneous current directions in the heating system. FIG. 5(c) illustrates that this arrangement produces a direction of instantaneous electric current flow in passive inductor 220 that is oriented in the opposite direction compared to the instantaneous current flow in master inductor 210. This orientation of current flow is typically preferred for obtaining the interrupted hardness pattern shown in FIG. 1(b).

FIG. 5(e) is a diagrammatic illustration of an alternative passive inductor circuit that can be utilized with the master inductor circuit shown in FIG. 5(a) to produce a direction of an instantaneous current flow in passive inductor 220' that is oriented in the same direction as instantaneous current flow in active coil 210 (FIG. 5(c)) in the master inductor circuit. This orientation of electrical current flow is typically desirable for obtaining a non-interrupted hardness pattern that is shown in FIG. 1(c).

In some embodiments of the invention the master heating inductor and the passive heating inductor are configured for a counter instantaneous current flows of the master circuit alternating current and the passive circuit alternating current.

Figure 6B:
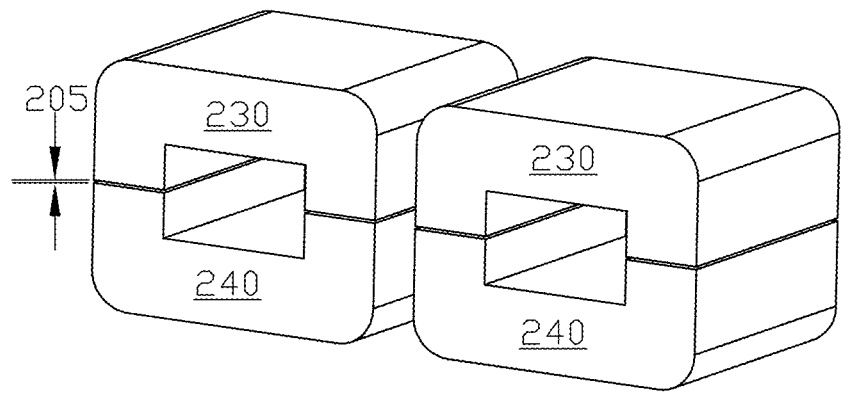
Figure 6A:
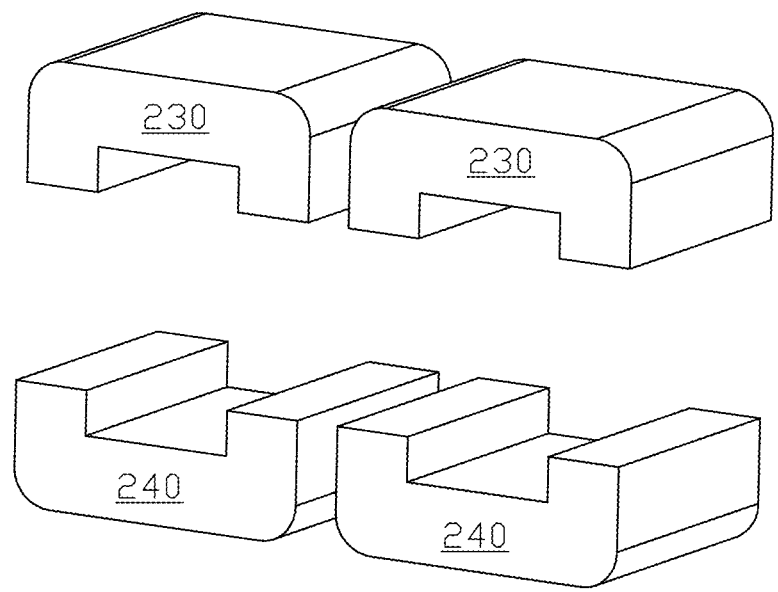

FIG. 6(a) illustrates master electromagnetic coupling regions 230 of a master inductor circuit and passive electromagnetic coupling regions 240 of a passive inductor circuit when the master inductor circuit is separated from the passive inductor circuit, for example, when a bearing workpiece to be heat treated is being loaded to a heating position or being unloaded from a heating position within a complementary pair of master and passive circuit inductors respectively in the master and passive inductor circuits. The master electromagnetic coupling regions and passive electromagnetic coupling regions are alternatively referred to as the master magnetic flux coupler and the passive magnetic flux coupler, respectively.

FIG. 6(b) illustrates master electromagnetic coupling regions 230 of a master inductor circuit and passive electromagnetic coupling regions 240 of a passive inductor circuit when the master inductor circuit is brought to a workpiece heating position where the active and passive electromagnetic coupling regions are separated by gap 205 to electrically separate the active inductor circuit from the passive inductor circuit while the master and passive inductor circuit are electromagnetically coupled when alternating current is supplied to the master inductor circuit. In the workpiece (bearing component) heating position the master magnetic flux coupler is disposed adjacent to and physically separated (by gap 205 in the example of FIG. 6(b)) from the passive magnetic flux coupler.

FIG. 7(a) and FIG. 7(b) illustrate in cross section alternative embodiments of the form and composition of the master and passive electrical bus networks with FIG. 7(a) illustrating each bus network comprising copper tubing and FIG. 7(b) illustrating rectangular copper bar sandwiched within the master and passive electromagnetic coupling regions that are separated by corresponding gaps 205a (FIG. 7(a)) and 205b (FIG. 7(b)) when in the workpiece heating position. The gaps may be air gaps or filled with a dielectric material. The arrangement shown in FIG. 7(b) is typically preferable compared to the arrangement shown in FIG. 7(a) due to better electromagnetic coupling between active and passive circuits. The master electrical conductor network and the passive electrical conductor network are alternatively referred to as the master inductor circuit bus network and the passive inductor circuit conductor network, respectively.

FIG. 8(a) through FIG. 8(d) diagrammatically illustrate one embodiment of a method of the present invention for inductively heat treating a bearing component's bearing features, such as an inner or outer race, where the quench process steps are performed when the induction heating apparatus remains with the bearing features in the apparatus in-heat (heating) position after heating of the bearing features is completed.

FIG. 9(a) through FIG. 9(d) diagrammatically illustrate another embodiment of a method of the present invention for inductively heat treating a bearing component's bearing features, such as an inner or outer race, where the quench process steps are performed by submerging at least the passive inductor coil of the passive inductor circuit with the bearing features in a quenchant tank. In this embodiment, a corresponding section of the passive inductor coil circuit is used as a support (nest) to hold heat treated bearing features in place during the quench process steps.

FIG. 10(a) through FIG. 10(d) diagrammatically illustrate another embodiment of a method of the present invention for inductively heat treating the bearing features on a bearing workpiece, such as an inner bearing race or outer bearing race, where the quench process steps begin when the bearing workpiece remains in the induction heating apparatus after the bearing features on the bearing workpiece have been inductively heated with the apparatus in the assembled (heating) position (FIG. 10(b)) and the quenching process continues as the bearing workpiece with the heated bearing features transfers (FIG. 10(c)) with the passive heating inductor coil 220 in the passive inductor circuit to a quenchant tank (FIG. 10(c)) where the quench process is completed.

FIG. 11(a) and FIG. 11(b) diagrammatically illustrate another embodiment of a method of the present invention for inductively heat treating a bearing component's bearing features, such as an inner or outer bearing race, where bearing features on at least two separate bearing components (workpieces) are heated simultaneously and combined with subsequent quenching process steps after the simultaneous heating is completed.

FIG. 12(a) illustrates an induction heating apparatus of the present invention in which two separate bearing components (workpieces) can be heated simultaneously and used in the method illustrated in FIG. 11(a) and FIG. 11(b).

FIG. 12(b) partially illustrates in enlarged detail one end of the induction heating apparatus shown in FIG. 12(a).

Figure 13:
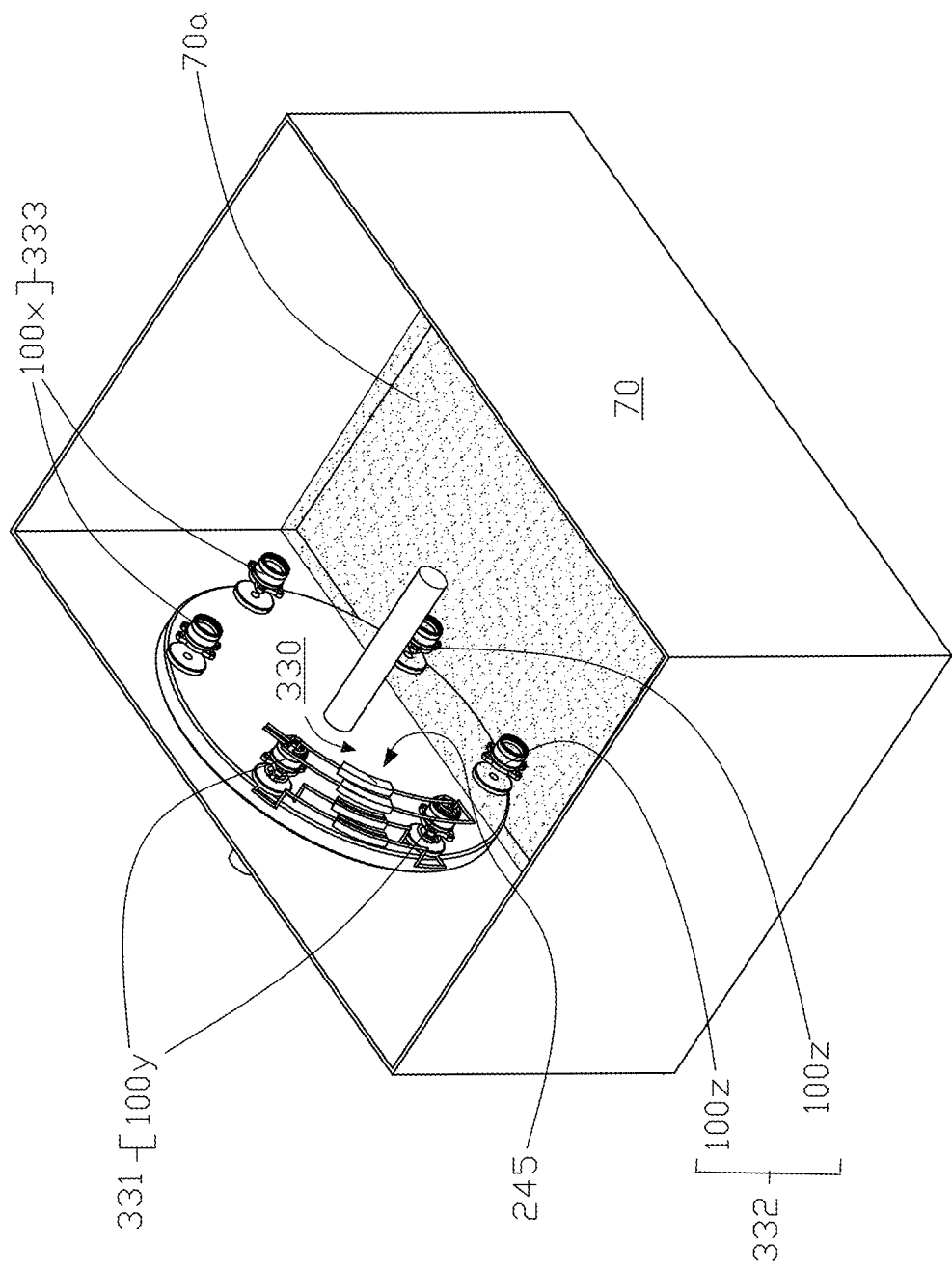

FIG. 13 is one embodiment of the present invention where the induction heating apparatus is positioned adjacent to a vertically oriented rotary table on which multiple separate workpieces can be loaded, for example, after prior heating; rotated to a heat treatment location and loaded in the induction heating apparatus for heat treatment of bearing features; and rotated to a quench treatment location.

Figure 14A:
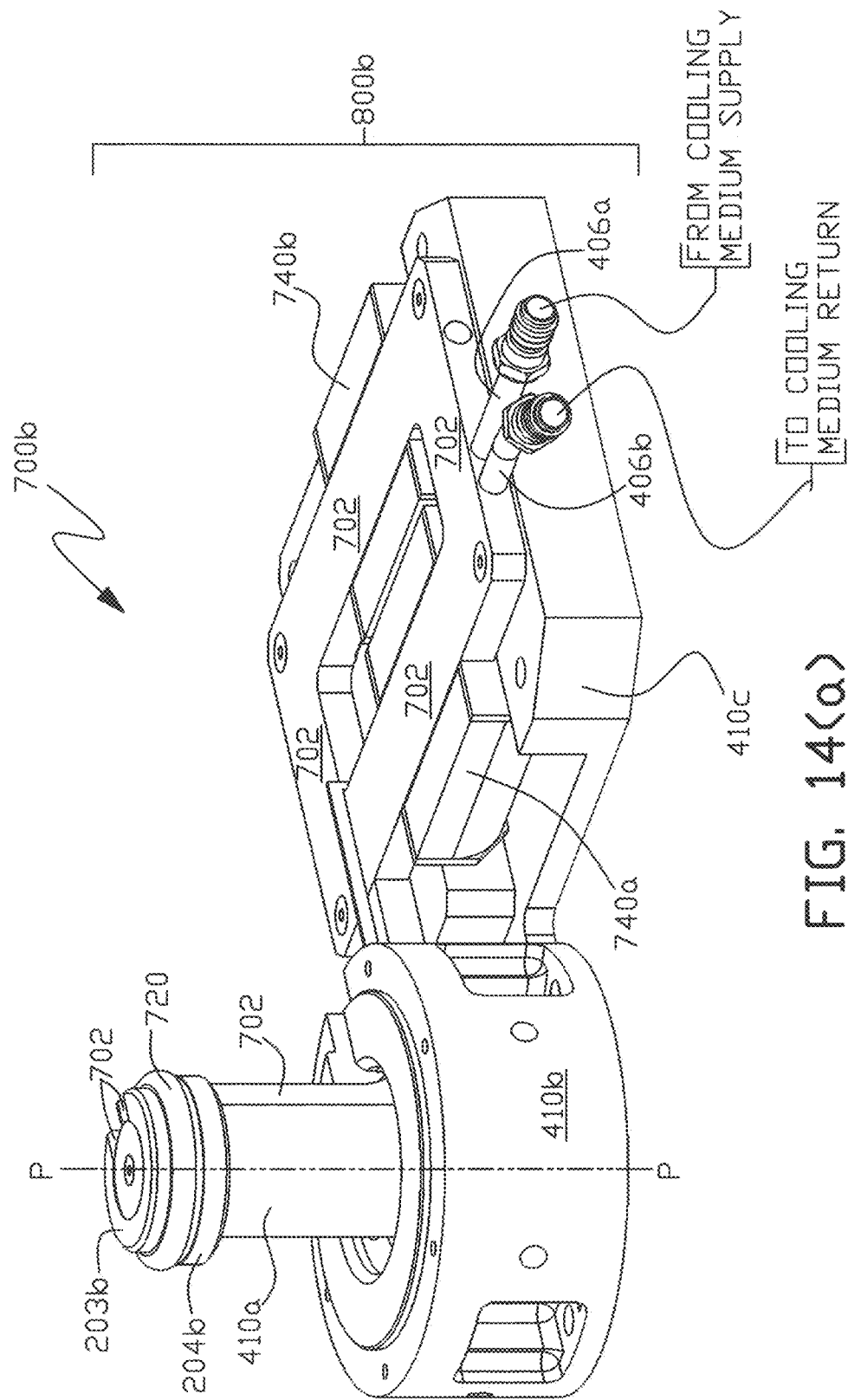
Figure 16B:
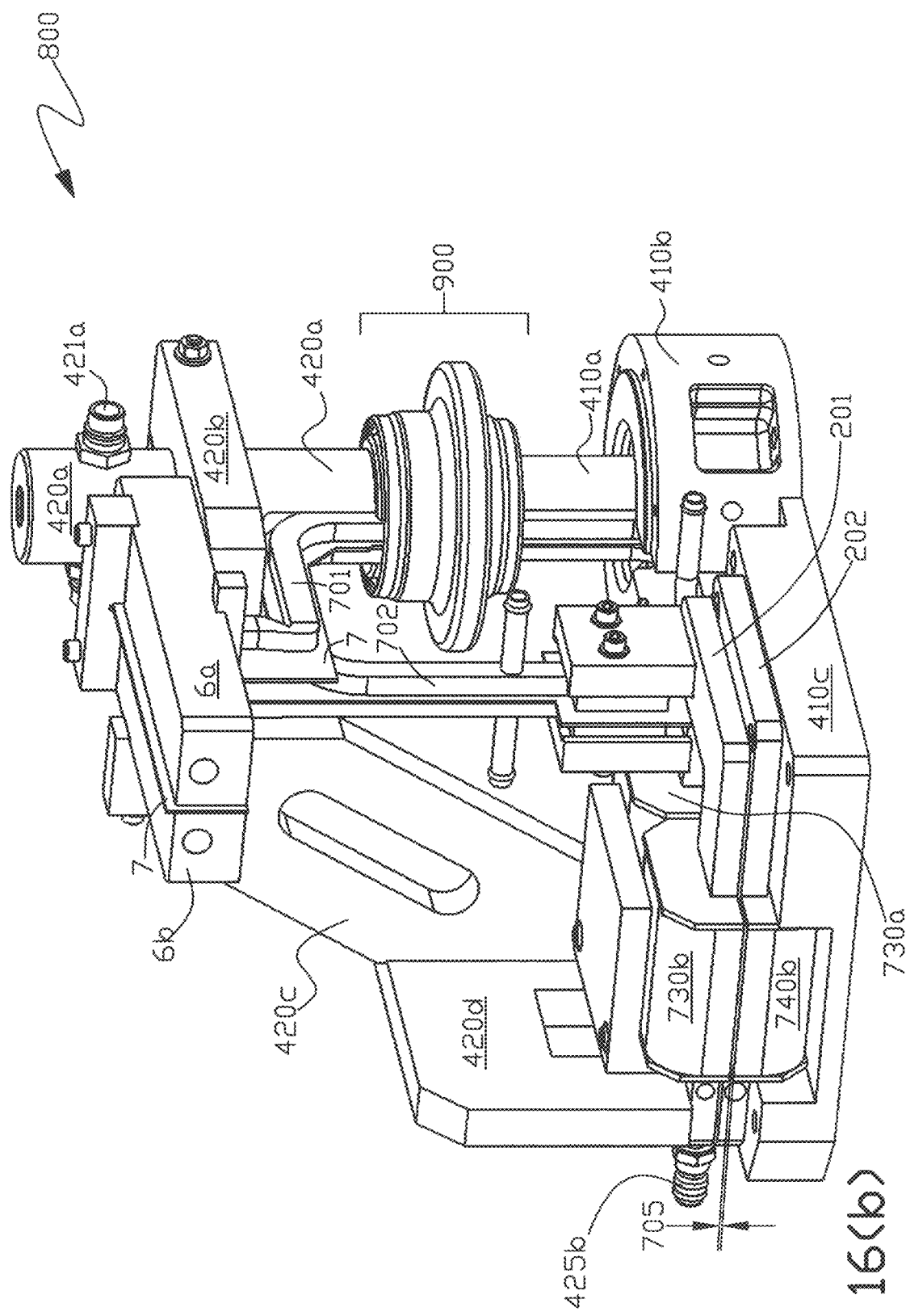

FIG. 14(a) is a perspective view of configured passive inductor assembly 800b of configured induction heat treatment apparatus 800 shown in a bearing component (workpiece) heating position in FIG. 16(a) and FIG. 16(b).

Figure 14B:
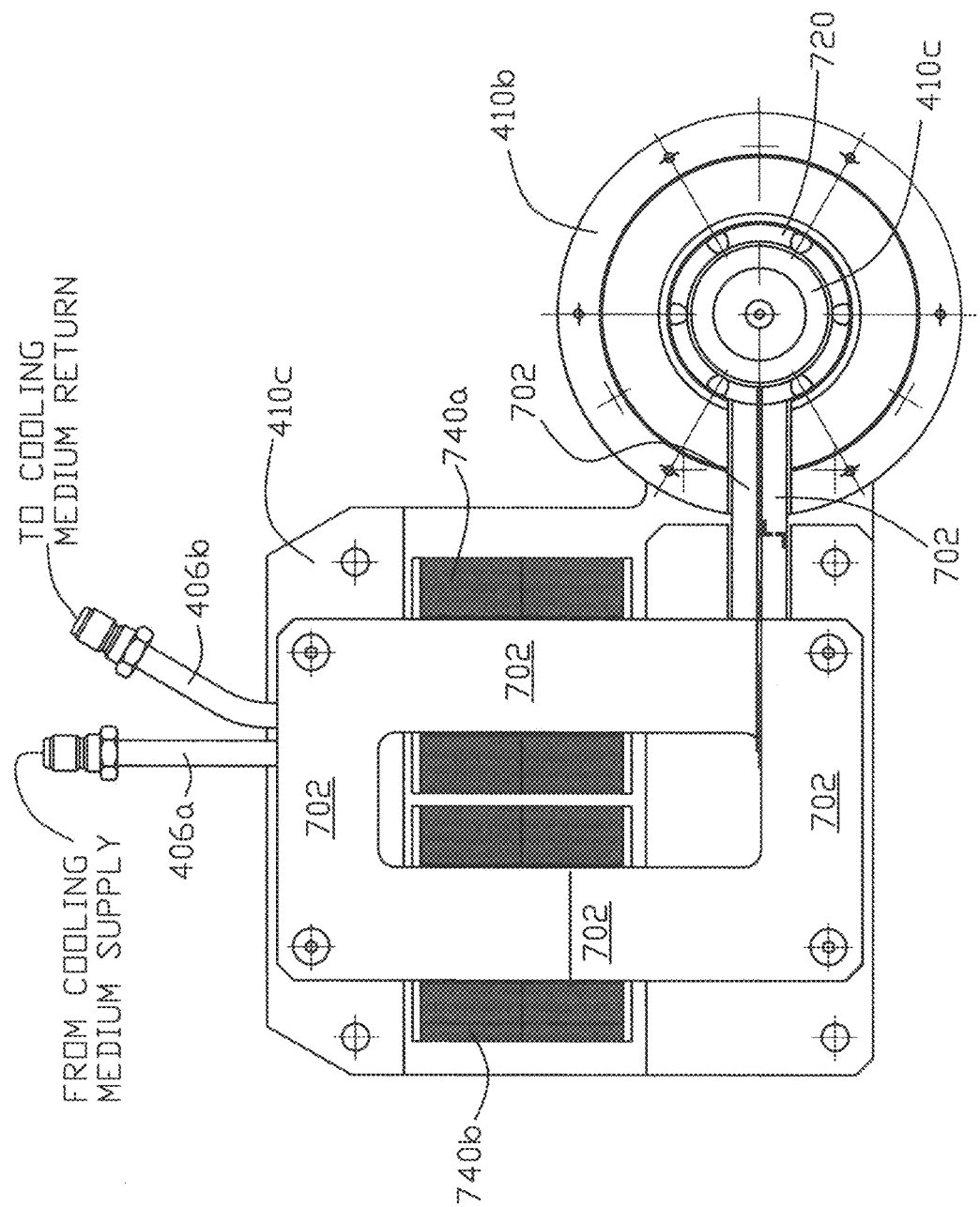

FIG. 14(b) is a top planar view of the passive inductor assembly shown in FIG. 14(a).

Figure 14C:
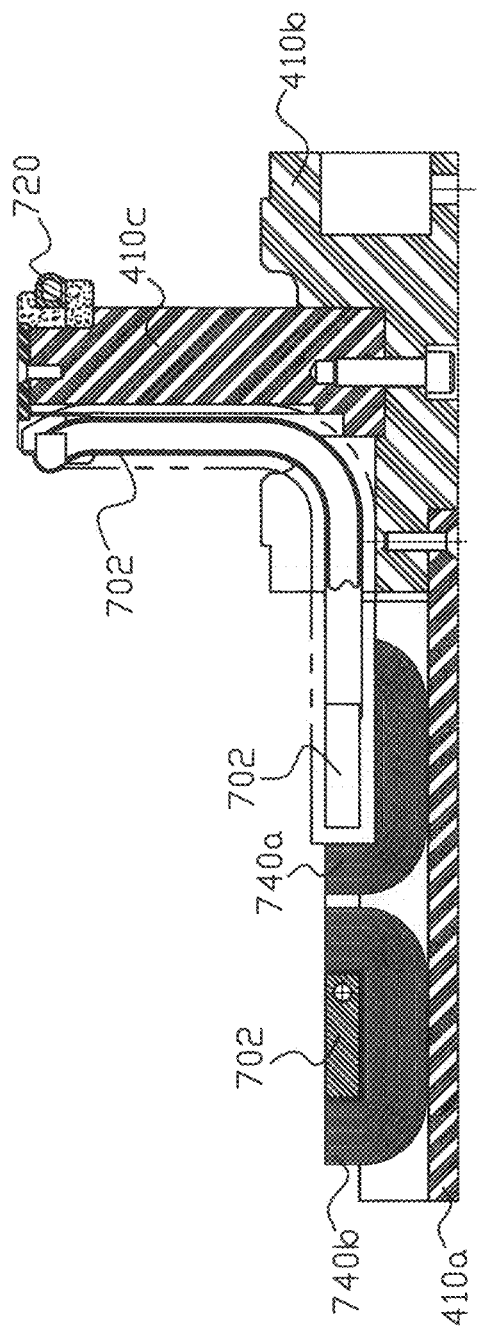

FIG. 14(c) is a side cross sectional view of the passive inductor assembly shown in FIG. 14(a).

FIG. 15(a) is a perspective view of configured master inductor assembly 800a of induction heat treatment apparatus 800 shown in a bearing component (workpiece) heating position in FIG. 16(a) and FIG. 16(b).

Figure 15B:
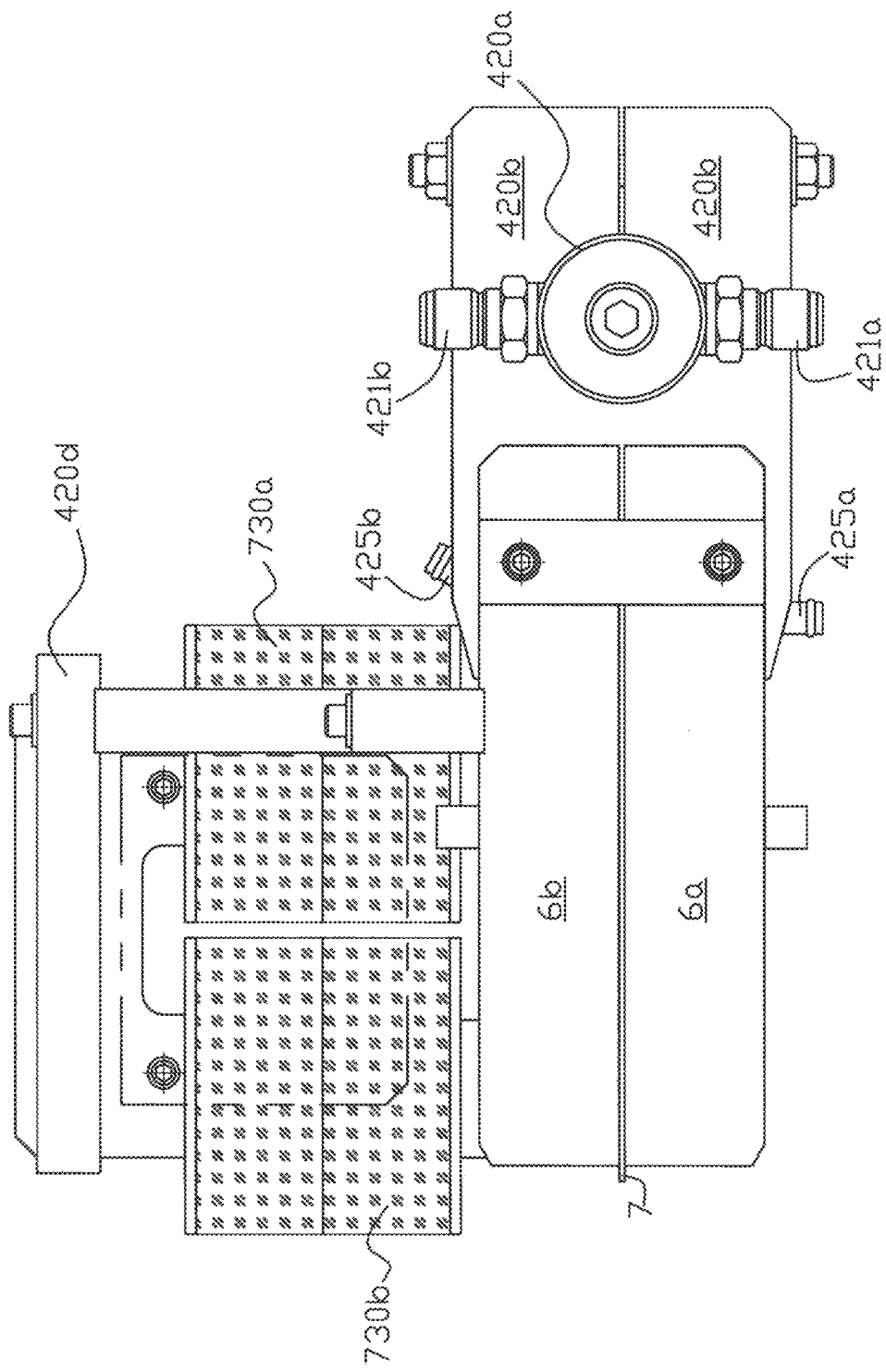

FIG. 15(b) is a top planar view of the master inductor assembly shown in FIG. 15(a).

Figure 15C:
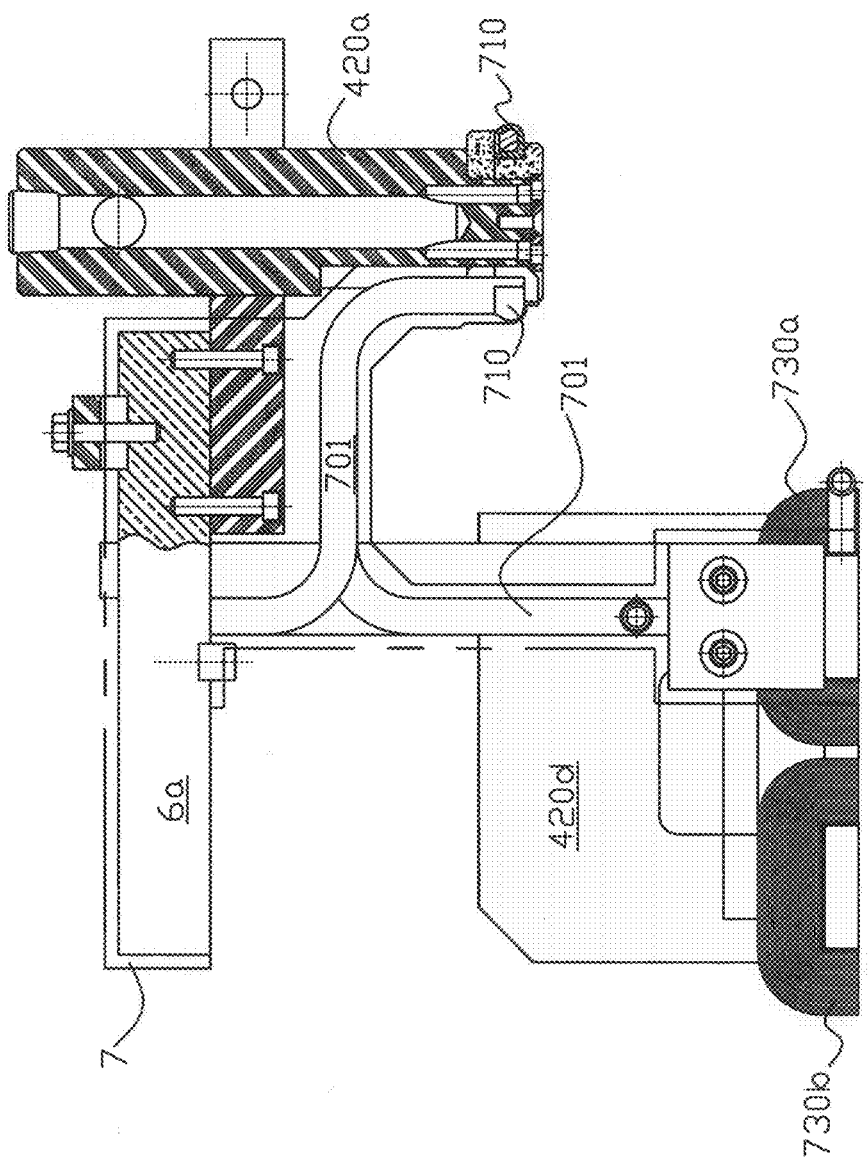

FIG. 15(c) is a side cross sectional view of the master inductor assembly shown in FIG. 15(a).

FIG. 16(a) and FIG. 16(b) are alternate perspective views of one example of electric induction heat treatment apparatus 800 with passive inductor assembly 800b (FIG. 14(a)) and master inductor assembly 800a (FIG. 15(a)) configured in the workpiece heating position for electric induction heating of workpiece bearing features, such as inner bearing races.

FIG. 17(a) diagrammatically illustrates an alternative split multiple coil electric induction heat treatment system for simultaneous heating of one or more features of a bearing component configured with two separate master inductor circuits powered by separate phase-locked outputs from a single power supply with FIG. 17(b) and FIG. 17(c) illustrating both output currents in-phase and out-of-phase respectively.

Figure 18:
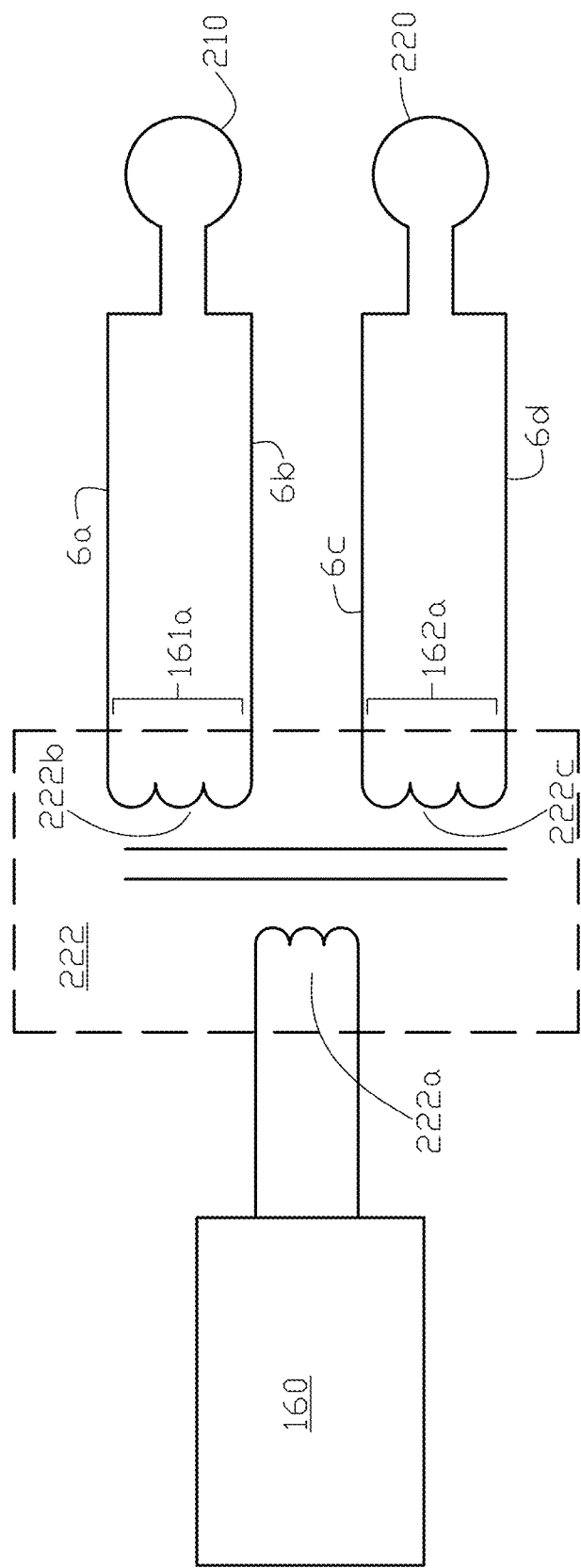

FIG. 18 diagrammatically illustrates an alternative split multiple coil electric induction heat treatment system for simultaneous heating of one or more features of a bearing component configured with two separate master inductor circuits powered by a single power supply with single output feeding the primary of a transformer with two secondary outputs each feeding a separate master inductor circuit.

DETAILED DESCRIPTION OF THE INVENTION

Referring to the drawings, wherein like numerals indicate like elements, there is diagrammatically illustrated in FIG.

5(a) through FIG. 5(d) one embodiment of the present invention having a master inductor circuit 200a and a passive inductor circuit 200b that can be assembled to inductively heat treat an inner bearing race, an outer bearing race or other bearing features of a bearing component that is used, for example, in heavy duty applications utilizing rolling elements, bearings, raceways or rings, including powertrain applications, driveline applications and wheel assemblies where the bearing component is complex in construction. The bearing component is alternatively described herein as the bearing workpiece.

Figure 5A:
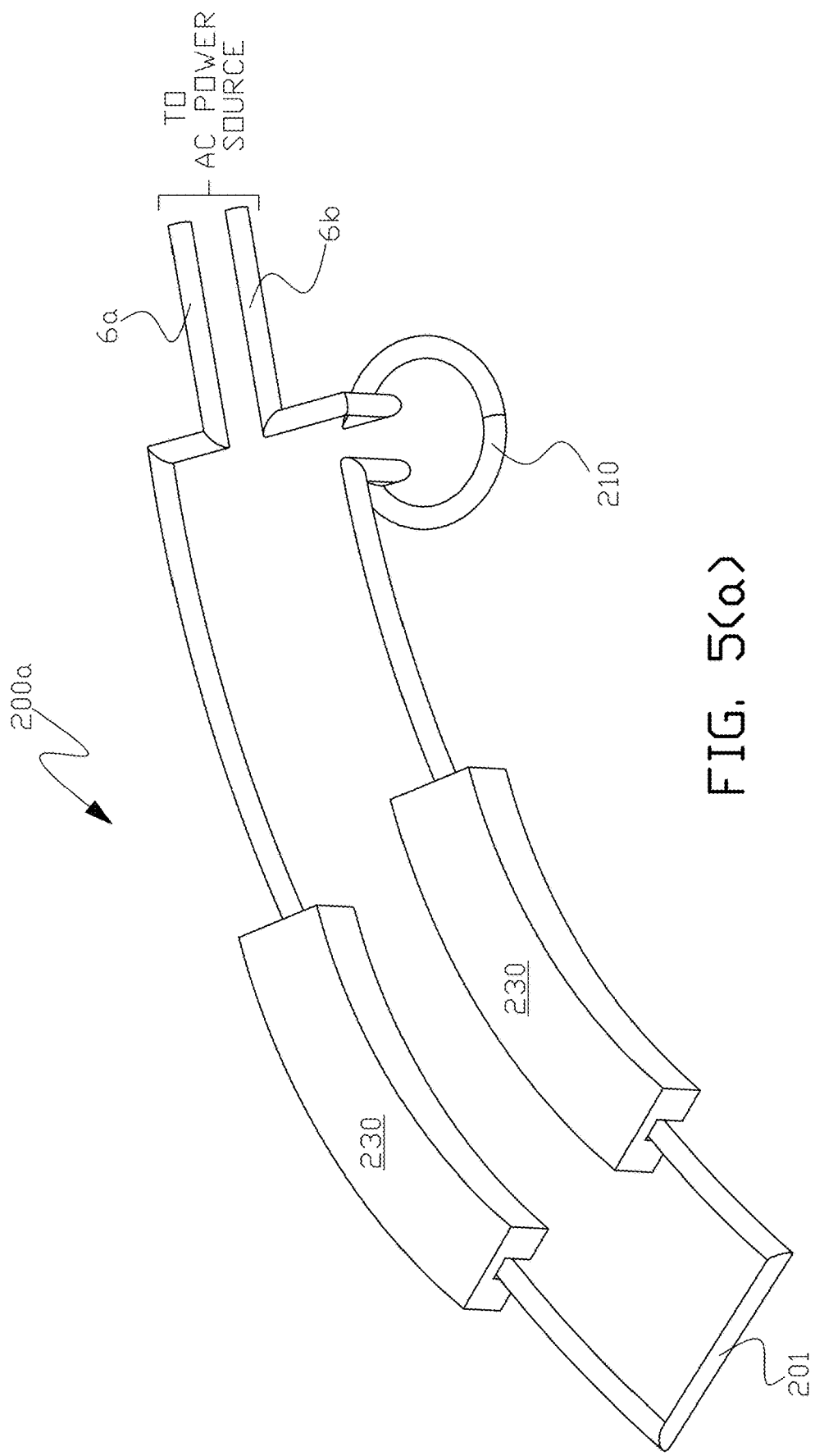
Figure 5B:
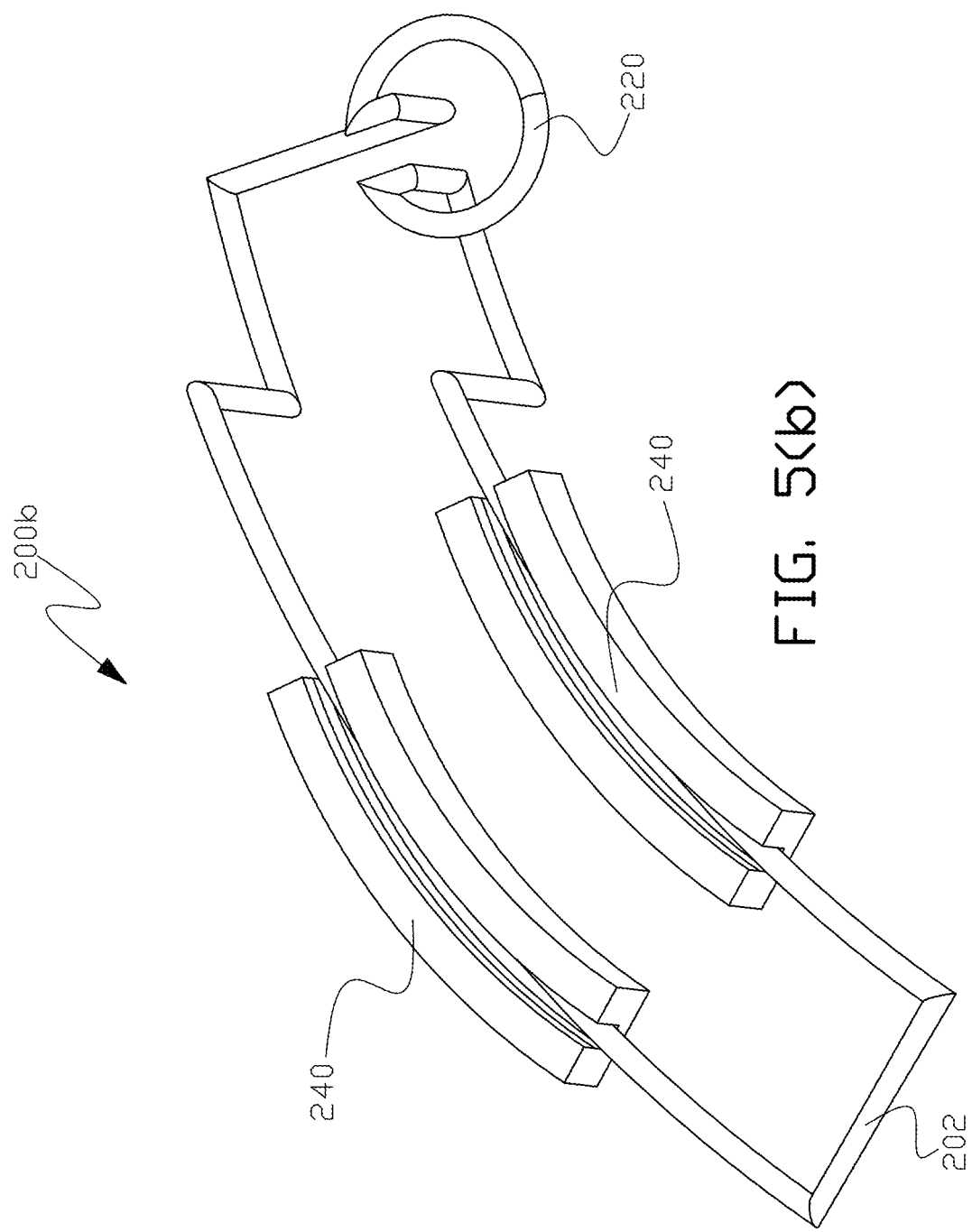
Figure 5C:
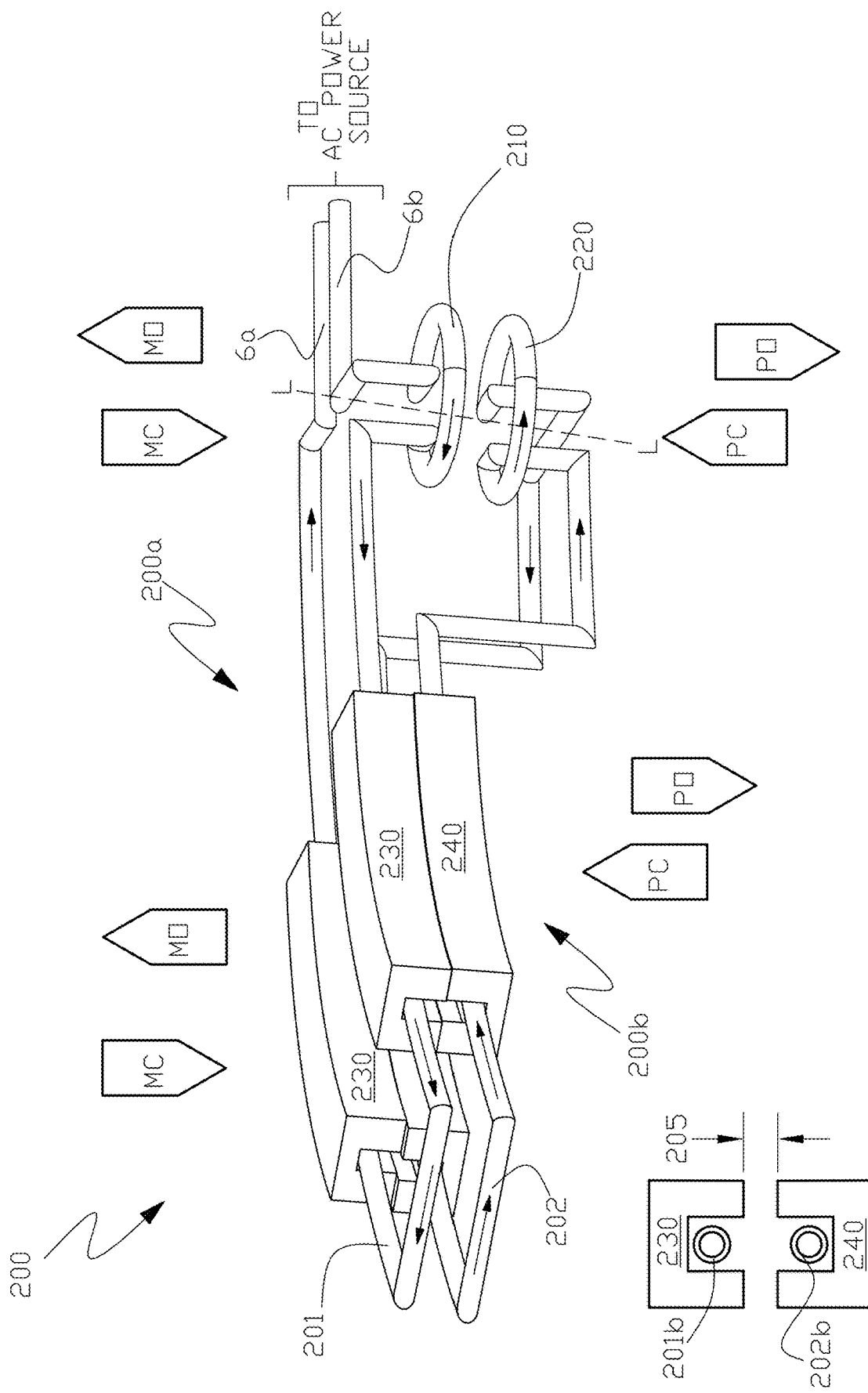

The master inductor circuit and the passive inductor circuit form an assembled bearing workpiece electric induction heat treatment apparatus 200, as illustrated in FIG. 5(c) or FIG. 5(d), where selective bearing features can be simultaneously heat treated with the master heating inductor and the passive heating inductors separately configured in the master inductor circuit and the passive inductor circuit for each of two or more different bearing features when the master inductor circuit on the master inductor assembly and the passive circuit on the passive inductor assembly are in the bearing component heating position illustrated, for example, in FIG. 5(c) or FIG. 5(d). Therefore apparatus 200 can also be described as a split multiple coil (master heating inductor and passive heating inductor) with a split inductor assembly for simultaneous heating of a plurality of bearing features on a bearing component where the split inductor assembly is formed by the master inductor circuit on a master inductor assembly and the passive inductor circuit on a passive inductor assembly.

In the illustrated embodiment of the invention, master inductor circuit 200a comprises master heating inductor 210 formed from: a first single turn induction coil and configured for induction heating of a first bearing feature to be simultaneously heat treated on the bearing component; one or more master circuit magnetic flux coupling regions 230 forming a master magnetic flux coupler; and master inductor circuit power terminals 6a and 6b, all of which master circuit components are electrically interconnected by a master inductor circuit conductor network 201 to form a series master circuit with all components of the master circuit component physically and electrically connected in series except for the master magnetic flux coupler that is not physically connected in the master inductor circuit with separation by an air gap or a gap with dielectric material. The master magnetic flux coupler is positioned adjacent and physically separate from the master inductor circuit conductor network 201 to couple magnetic flux from the master inductor circuit when alternating current flows in the master inductor circuit. Master inductor circuit power terminals 6a and 6b connect the master inductor circuit 200a to a suitable alternating current power supply (designated AC POWER SOURCE in the drawings). The alternating current power supply can be selected for a particular application from medium frequency or high frequency power supplies known in the art for selective heat treatment of the bearing features and may be supplied with input power from utility power where the induction heat treatment apparatus is located. Typical rating for the power source is in a range from 30 kW to 500 kW with an operating frequency of 1 kHz to 180 kHz as required for specified hardness case depths; geometry of the heat treated bearing features; the mass of heated metallic material forming the bearing workpiece and production rate (cycle time per heat treated bearing feature). The single phase two conductor output of the selected power supply is connected to master inductor circuit power terminals 6a and 6b either: directly; via a power supply bus network; or via a load matching transformer depending upon the power supply configuration and the supply's load matching capability.

In the embodiment of the invention illustrated in FIG. 5(b) through FIG. 5(d) passive inductor circuit 200b comprises passive heating inductor 220 formed from: a second single turn induction coil and configured for induction heating of a second bearing feature to be simultaneously heat treated on the bearing component; and one or more passive circuit magnetic flux coupling regions 240 forming a passive magnetic flux coupler. The passive heating inductor 220 forms a physically and electrically closed loop series passive inductor circuit with passive inductor circuit conductor network 202. When apparatus 200 is in a heating or assembled position as in FIG. 5(c) or FIG. 5(d) the passive magnetic flux coupler is positioned adjacent and physically separated from the passive circuit conductor network 202 and the master inductor circuit conductor network 201 by air gaps or gaps with dielectric material so that when a master alternating current flows in the master inductor circuit a passive alternating current flow is induced in the passive inductor circuit.

While the master and passive heating inductors are configured as single turn solenoidal coils in the figures, other configurations of inductors can be utilized in other examples of the invention as required for a particular configuration of the bearing features to be heated by the master heating inductor or the passive heating inductor, for example, whether inner or outer bearing features will be heat treated.

In other examples of the invention the active heating inductor or the passive heating inductor may be of different configurations such as a multiple turn coil. Further in other examples of the invention more than one bearing feature may be heated by the master heating inductor or the passive heating inductor so that a plurality of more than two bearing features can be heated simultaneously.

The one or more master circuit magnetic flux coupling regions 230 forming the master magnetic flux coupler and the one or more passive circuit magnetic flux coupling regions 240 forming the passive magnetic flux coupler can be alternatively formed from: standard lamination packs; pure ferrites; or conventional iron or ferrite based powder materials, including magnetic composites containing pressed and sintered magnetic particles as known in the art.

In one embodiment of the invention master inductor circuit 200a and passive inductor circuit 200b are selectively brought together (also referred to as assembling the electric induction heat treatment apparatus to the heating position) from opposing longitudinal side ends of a bearing workpiece (for example, bearing workpiece 100 in FIG. 1(b) with selected multiple bearing features such as inner bearing races requiring heat treatment) in a heat treatment process step of loading the bearing workpiece for heat treatment with the apparatus. This process step of assembly of the apparatus to the heating position is illustrated in FIG. 5(c) where axis L-L represents the central interior longitudinal axis L-L of the example bearing workpiece 100 in FIG. 1(b) which is not shown within master heating inductor 210 and passive heating inductor 220 for clarity where the master heating inductor lowers from the top over the upper longitudinal side end L-L of the bearing workpiece as indicated by direction of motion arrow MC and passive heating inductor raises from the bottom over the lower longitudinal side end of the bearing workpiece as indicated by direction of motion arrow PC. Reference is made to FIG. 12(a) and FIG. 12(b) where bearing workpiece 100 is shown positioned in the heating position of heating apparatus 245 within master heating inductor 210*a*" and passive heating inductor 220*b*". This configuration of assembly of the apparatus to the heating position from opposing longitudinal side ends of the bearing workpiece eliminates the possibility that the geometry of the master circuit inductor, or the passive circuit inductor, would respectively create a physical interference with the feature of the bearing workpiece to be heated by the passive circuit inductor, or the feature of the bearing workpiece to be heated by the active circuit inductor. Similarly the heat treatment process step of unloading (removing) the bearing workpiece after heat treatment from the heat treatment apparatus when the master inductor circuit 200*a* and the passive inductor circuit 200*b* is accomplished by separating the master inductor circuit and the passive inductor circuit from each via opposing longitudinal side ends of the bearing workpiece as illustrated by the direction of master heating inductor unloading motion arrow MO in FIG. 5(*c*) and the direction of passive heating inductor unloading motion arrow PO in FIG. 5(*c*). The process steps of bringing together and separating the master inductor circuit with master heating inductor 210 and the passive inductor circuit with passive heating inductor 220 from the opposing longitudinal side ends of the bearing workpiece L-L enable close proximity (typically 0.5 mm to 6 mm) of master heating inductor 210 and passive heating inductor 220 to the bearing features to be respectively heat treated by the master heating inductor and the passive heating inductor, for example bearing race regions 101 and 102 in FIG. 1(*b*), when the bearing workpiece 100 has been loaded for heat treatment in the apparatus. In this example, the smaller diameter intermediate race region 103 of the bearing workpiece between heat treatment regions 101 and 102 shown in FIG. 1(*b*) will not obstruct (interfere with) bringing together the master heating inductor (coil) and the passive heating inductor (coil) to the workpiece loaded (heating) position since it is not required to have a sufficiently large radial clearance 107 illustrated in FIG. 2(*a*) during the workpiece loading and unloading process steps.

In some embodiments of the invention the split multiple coil electric induction heating system includes a split inductor assembly positioning apparatus configured to bring the master inductor circuit and the passive inductor circuit together to the assembled (heating) position and to separate the master inductor circuit and the passive inductor circuit from the assembled (heating) position along with the movement of the master and passive magnetic flux coupler as indicated by the arrows in FIG. 5(*c*) which can represent linear actuators for motions shown by the arrows. In the assembled (heating) position the master heating inductor of the master inductor assembly is longitudinally aligned with the passive heating inductor of the passive inductor assembly and position of the passive magnetic flux coupler is adjacent to and physically separated from the master magnetic flux coupler when a first bearing feature is positioned for inductive heating with the master heating inductor and the second bearing feature is positioned for inductive heating with the passive heating inductor for simultaneous heating of the first bearing feature and the second bearing feature. In the non-heating position the master heating inductor of the master inductor assembly is separated from the passive heating inductor of the passive inductor assembly for positioning of the bearing component in the bearing component heating position for inductive heating of the first bearing feature and the second bearing feature or removal of the bearing component after inductive heating of the first bearing feature and the second bearing feature in the bearing component heating position.

FIG. 5(*c*) and FIG. 5(*d*) show perspective views of master inductor circuit 200*a* and passive inductor circuit 200*b* after being brought together to a bearing workpiece heating position with a loaded bearing workpiece positioned within the master circuit inductor and the passive circuit inductor. The bearing workpiece is not shown (along with optional post-heating quench apparatus) in these figures for clarity of the assembled master heating inductor and passive heating inductor circuit.

In the embodiment of the invention illustrated in FIG. 5(*a*) through FIG. 5(*d*), the master inductor circuit conductor network 201 and the passive inductor circuit conductor network 202 are illustrated as copper tubing busses disposed respectively between U-shaped master circuit magnetic flux coupling regions 230 and passive circuit magnetic flux coupling regions 240.

There is no physical contact or electrical circuit contact between components of master inductor circuit 200*a* and components of passive inductor circuit 200*b* when they are in a workpiece heating position as shown, for example, in FIG. 5(*c*) or FIG. 5(*d*), and when one or more heat treatment process steps are being performed to heat bearing features of a bearing workpiece positioned adjacent to the master and passive heating inductors. Master inductor circuit magnetic flux coupling regions 230 are adjacently disposed, but physically spaced apart from passive inductor circuit magnetic flux coupling regions 240 by separation distance 205 as illustrated by the cross sectional detail in FIG. 5(*c*) or FIG. 5(*d*) to transfer magnetic flux established by alternating current flow in the master inductor circuit conductor network to the passive inductor circuit.

FIG. 16(*a*) and FIG. 16(*b*) illustrate in alternative perspective views one embodiment of a configured induction heat treatment apparatus 800 of the present invention utilizing an assembled induction heat treatment apparatus 200 similar to that shown in FIG. 5(*c*) and FIG. 5(*d*). The configured induction heat treatment apparatus 800 is shown in FIG. 16(*a*) and FIG. 16(*b*) in the bearing component (workpiece) heating position with an exemplary bearing workpiece 900 loaded in the apparatus for simultaneous heating of two bearing features on the bearing workpiece. In this non-limiting example the bearing component has an upper inner bearing race (also referred to as the first workpiece bearing feature to be heated by the master heating inductor) requiring heat treatment and a lower inner bearing race (also referred to as the second workpiece bearing feature to be heated by the passive heating inductor) requiring simultaneous heat treatment, with axially separation from each other by central bearing workpiece feature that is not heat treated. The interior of bearing workpiece 900, which is not visible in FIG. 16(*a*) and FIG. 16(*b*) since the workpiece is loaded in the bearing component heating position of apparatus 800, may be, for example, similar to the interior of bearing workpiece 100 in FIG. 1(*a*) and FIG. 1(*b*) where the upper inner bearing race is inner bearing race 101*a*; the lower inner bearing race is 102*a*; and the non-heated central bearing workpiece feature is region 103 in FIG. 1(*a*) and FIG. 1(*b*). Configured induction heat treatment apparatus 800 comprises configured master inductor assembly or section 800*a* and configured passive inductor assembly or section 800*b*.

FIG. 14(*a*) through FIG. 14(*c*) are various views of configured passive inductor assembly 800*b* when separated from configured active inductor assembly 800*b*, for example, in a bearing workpiece non-heating position. FIG. 15(*a*) through FIG. 15(*c*) are various views of configured master inductor assembly 800*a*, when separated from configured passive inductor assembly 800b, for example, in a bearing workpiece non-heating position. In this example of the invention, configured passive inductor assembly 800b is alternatively referred to as the lower inductor assembly, and configured master inductor assembly 800a is alternatively referred to as the upper inductor assembly for convenient descriptive orientation, and not by way of limiting the orientation of passive inductor assembly and the master inductor assembly forming induction heat treatment apparatus 800.

Configured master inductor circuit 800a comprises: master heating inductor 710 formed from a first single turn induction coil in this non-limiting example, mounted around and near to the lower end of mandrel 420a; master circuit magnetic flux coupling regions 730a and 730b that form a master circuit magnetic flux coupler; and master inductor circuit power terminals 6a and 6b separated by electrical insulating material 7; all of which components are associated with master inductor circuit conductor network 701. Master inductor circuit power terminals 6a and 6b connect the master inductor circuit 800a to a suitable alternating current power supply (designated AC POWER SOURCE in the drawings). The master heating inductor is configured for induction heating of the first workpiece bearing feature to be heat treated. In some embodiments of the invention mandrel 420a is referred to as quench mandrel as further described below.

The configured master inductor circuit 800a further comprises optional upper master magnetic flux concentrator 203a that is ring-shaped and disposed above master heating inductor 710 around quench mandrel 420a, and optional lower master magnetic flux concentrator 204a disposed below the master heating inductor to direct inductive heating flux to first bearing workpiece feature being heated by master heating inductor 710.

Configured master inductor circuit 800a further comprises components of an auxiliary master inductor circuit forced liquid cooling medium system with master inductor circuit cooling medium provided by supply cooling tube 425a and return cooling tube 425b and circulated in a hollow internal through passage in the master inductor circuit conductor network 701.

In this non-limiting example configured master inductor circuit 800a includes an optional integrated quench apparatus, namely quench mandrel 420a with quench passages not shown in the figures that supply quenchant to the heat treated features of the bearing workpiece in the workpiece heating position with the quenchant supplied via quench supply ports 421a and 421b near the upper end of the quench mandrel.

Configured master inductor circuit 800a further comprises one or more master inductor circuit support structures as may be required for a particular arrangement of a configured master inductor circuit. In the example shown in the figures, configured induction heat treatment apparatus 800 includes, but is not limited to, support clamp block 420b that retains quench mandrel 420a in position; support riser 420c; and adjustable support bridge 420d.

Configured passive inductor circuit 800b comprises: passive heating inductor 720 formed from a second single turn induction coil in this non-limiting example, mounted around and near to the upper end of support post 410a (also referred to as the vertically oriented support structure); passive circuit magnetic flux coupling regions 740a and 740b that form a passive circuit magnetic flux coupler; all of which components are associated with passive inductor circuit conductor network 702 that is also referred to as a passive inductor bus network and forms an electrically closed loop passive bus network. The passive heating inductor is configured for induction heating of the second workpiece bearing feature to be heat treated.

The configured passive inductor circuit 800b further comprises optional upper passive magnetic flux concentrator 203b that is ring-shaped and disposed above passive heating inductor 720 around support post 410a, and optional lower passive magnetic flux concentrator 204b disposed below the master heating inductor to direct inductive heating flux to the bearing workpiece feature being heated by passive heating inductor 720.

Configured passive inductor circuit 800b in the illustrated embodiment of the invention further comprises components of an auxiliary passive inductor circuit forced liquid cooling medium system with passive inductor circuit cooling medium provided by supply cooling tube 406a and return cooling tube 406b and circulated in a hollow internal through opening in the passive inductor circuit conductor network 702.

Configured passive inductor circuit 800b further comprises one or more passive inductor circuit support structures as may be required for a particular arrangement of a configured passive inductor circuit. In the example shown in the figures, configured induction heat treatment apparatus 800 includes, but is not limited to, support post 410a (also referred to as the vertically oriented support structure); passive circuit inductor mounting base 410b; and passive circuit support cradle 410c.

Configured master inductor circuit 800a and passive inductor circuit 800b can be brought together (also referred to as assembling the electric induction heat treatment apparatus) from opposing longitudinal side ends of a bearing workpiece (for example, bearing workpiece 900) with selected multiple features of inner bearing races requiring heat treatment) in a heat treatment process step of loading the bearing workpiece for heat treatment with the apparatus. Assembly of the apparatus from opposing side ends of the bearing workpiece eliminates the possibility that the geometry of the master circuit inductor, or the passive circuit inductor, would respectively create a physical interference with the feature of the bearing workpiece to be heated by the passive circuit inductor, or the feature of the bearing workpiece to be heated by the active circuit inductor. Similarly the heat treatment process step of unloading (removing) the bearing workpiece after heat treatment from the heat treatment apparatus is accomplished by separating the configured master inductor circuit and the configured passive inductor circuit from each via opposing longitudinal side ends of the bearing workpiece. In some embodiments of the invention (for example, as illustrated in FIG. 9(a) through FIG. 9(d) and FIG. 10(a) through FIG. 10(d) the configured passive inductor circuit 800b is separated from the configured master inductor circuit 800a but not from the bearing workpiece (FIG. 9(c) and FIG. 10(c)) with the bearing workpiece seated in the passive inductor with dielectric insulation from the passive inductor in a structure known in the art as a dielectric nest. Only after the completion of the quenching cycle the bearing workpiece will be finally removed from the configured passive inductor circuit 800b. The process steps of bringing together and separating the master inductor circuit and the passive inductor circuit from the opposing longitudinal side ends of the bearing workpiece allows close proximity placement of the master heating inductor 710 and the passive heating inductor 720 to the bearing features to be respectively heat treated by the configured master heating inductor and the configured passive heating inductor. In the embodiment of the invention illustrated in FIG. 5(a) through FIG. 5(d), the master inductor circuit conductor network 201 and the passive inductor circuit conductor network 202 are illustrated as copper tubing busses disposed between U-shaped master circuit magnetic flux coupling regions 230 and passive circuit magnetic flux coupling regions 240.

There is no physical contact or electrical circuit contact between components of configured master inductor circuit 800a and components of configured passive inductor circuit 800b when they are in a workpiece heating position as shown, for example, in FIG. 16(a) or FIG. 16(b), and when one or more heat treatment process steps are being performed. Configured master inductor circuit magnetic flux coupling regions 730a and 730b are adjacently disposed, but physically spaced apart from configured passive inductor circuit magnetic flux coupling regions 740a (hidden in drawing views) and 740b by separation distance 705 as illustrated in FIG. 16(a) and FIG. 16(b) to transfer magnetic flux established by alternating current flow in the master inductor circuit conductor network 701 to the passive inductor circuit conductor network 702. In some embodiments of the invention an electrical insulator is placed between magnetic flux coupling regions 730a and 730b, and/or between magnetic flux coupling regions 740a (hidden in drawing views) and 740b and/or between master inductor 701 and passive inductor 702 networks.

A bearing workpiece electric induction heating apparatus of the present invention, for example, configured induction heat treatment apparatus 800 can be moved between a workpiece heating position as shown in FIG. 16(a) or FIG. 16(b) by moving either the configured master inductor circuit, or the configured passive inductor circuit, or both the configured master and passive inductor circuits relative to each other in a direction (or directions) away from each other so that they are separated from each other and the loaded bearing workpiece (for example bearing workpiece 900 in FIG. 16(a) or FIG. 16(b). By way of example and not limitation, separation movement between the configured master and passive inductor circuits for loading or unloading a bearing workpiece from the workpiece heating position shown in FIG. 16(a) or FIG. 16(b) (with suitable workpiece electromechanical transport apparatus not shown in the figures) may be achieved with one or more suitable electromechanical linear or rotatory actuators configured for directional movement as required for a particular application.

After completion of a heating cycle and proper austenitization of selected bearing workpiece features with the electric induction heat treatment apparatus 800 illustrated in FIG. 14(a) through FIG. 16(b) quenching of the heat treated workpiece bearing features may be accomplished with quench apparatus integral to the heating apparatus or disposed at a location remote from the heating apparatus as described herein, or otherwise known in the art.

FIG. 7(a) and FIG. 7(b) illustrate in cross sectional views the master and passive circuit magnetic flux coupling regions 230 and 240 (magnetic flux concentrators) shown in FIG. 6(b) when alternatively used in an application where: (1) the master and passive inductor bus networks are formed from electrically conductive tubing 201a and 202a (such as a copper composition) inserted between (also referred to as "sandwiched") electromagnetic coupling regions 230a and 240a in FIG. 7(a); or (2) the master and passive inductor bus networks are formed from electrically conductive rectangular bars 201b and 202b (such as a copper bus bar) or rectangular-shaped tubing (not shown) inserted between (also referred to as "sandwiched") electromagnetic coupling regions 230b and 240b in FIG. 7(b) in air gaps or gaps of dielectric material. The use of rectangular copper busses illustrated in FIG. 7(b) is most commonly used.

Illustrative in-heat position spacing air gaps 205a in FIGS. 7(a) and 205b in FIG. 7(b) are sufficiently large to prevent electrical arcing or a short circuit between elements of master inductor circuit 200a and elements of passive circuit 200b. While air is not a preferred dielectric material, in alternative embodiments of the invention, an air gap can serve as a sufficient dielectric or in-heat position spacing gaps 205a or 205b may be filled with a conventional dielectric material as known in the art to electrically isolate electrical conductors. Such conventional dielectric materials include dielectric tapes, ceramic coatings or other electrical isolation materials known in the art.

Spacing air gap 205a in FIG. 7(a) and spacing air gap 205b in FIG. 7(b) should not be too large to negatively impact electromagnetic coupling between master inductor circuit 200a and passive inductor circuit 200b. Typically, but not by way of limitation, size of the spacing air gaps 205a and 205b (FIG. 7(b)) are within a range of 0.5 mm to 6 mm depending upon the electrical frequency, a magnitude of electrical current, as well as condition of working environment (such as, but not limited to, humidity, moisture and the presence of electrically conductive dust).

Reference is made to the teachings of U.S. Pat. Nos. 6,274,857 and 6,859,125 for fabrication features of the master and passive circuit magnetic flux coupling regions 230 and 240 for a particular application, including selection of an appropriate geometry of the magnetic flux couplings and methods of retaining them in-place, as well as a selection of an appropriate sizing of spacing air gap 205.

In one embodiment of a process of the present invention, after loading a workpiece with one or more features to be inductively heated and positioning both the master and passive induction coils of an apparatus of the present invention in the in-heat position as shown in FIG. 5(a) and FIG. 5(b), the alternating current power supply connected to circuit power terminals 6a and 6b is energized to initiate alternating current flow in the master inductor circuit. Master and passive circuit magnetic flux coupling regions 230 and 240 provide an electromagnetic coupling between the energized master inductor circuit and the electrically short-circuited passive inductor circuit similar to the effect between windings of a transformer core. Alternating current flowing in the master circuit inductor will instantly (practically speaking) generate electrical currents that flow within the closed-loop passive circuit thanks to the master and passive circuit magnetic flux coupling regions similar to electrical current flow in the primary windings and secondary windings of an electrical power transformer.

Figure 5F:
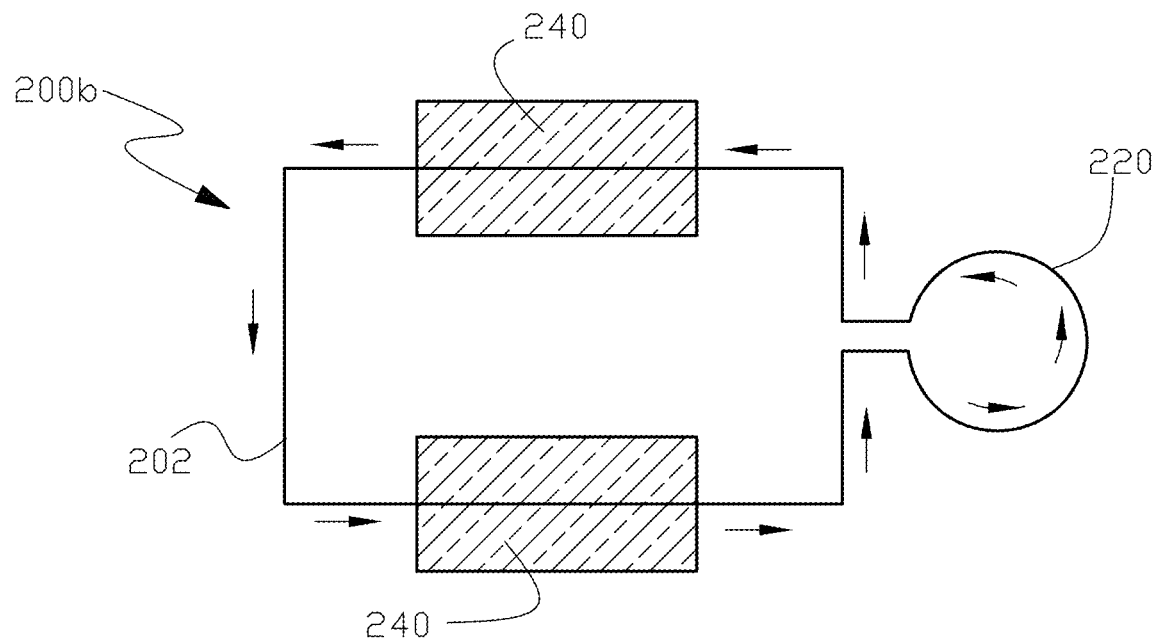
FIG. 5(f) and FIG. 5(g) illustrate alternative instantaneous alternating current directions achieved in the passive inductor coil when the master inductor circuit in FIG. 5(a) is combined with the passive inductor circuit in FIG. 5(b) in one embodiment of the present invention compared with when the master inductor circuit in FIG. 5(a) is combined with the passive inductor circuit in FIG. 5(e) in another embodiment of the present invention.
Figure 5G:
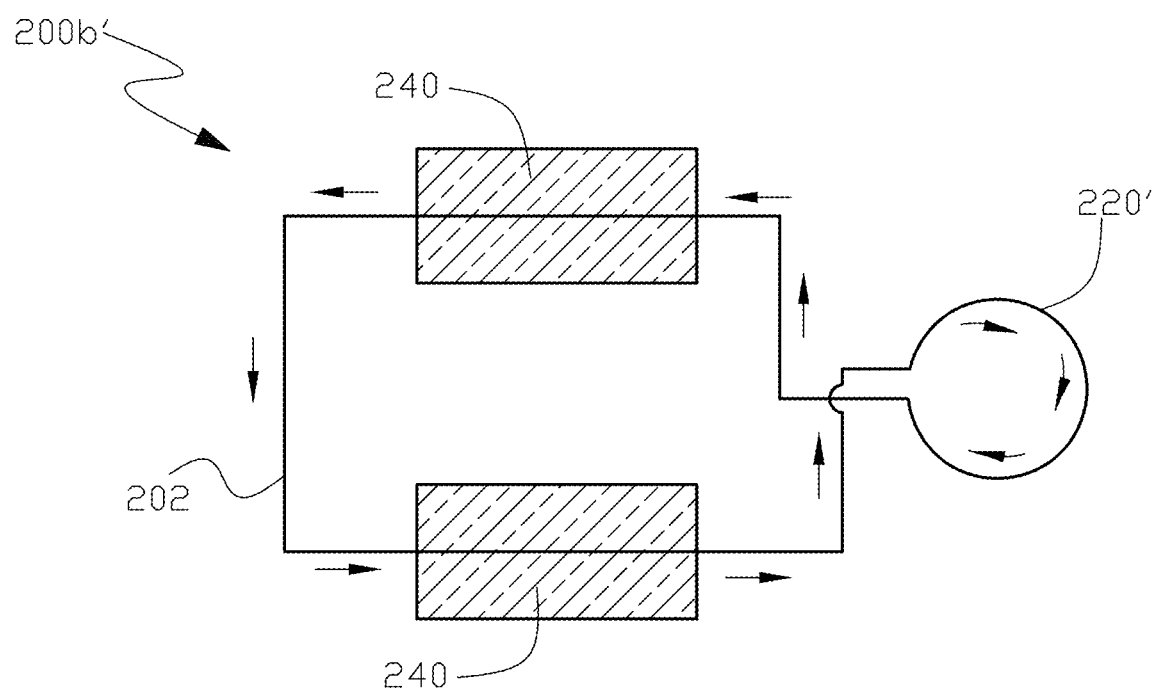

Instantaneous alternating current induced in passive inductor circuit 200b will be oriented in the opposite direction from that of the source current flowing in the master inductor circuit as illustrated, for example, by the arrows in FIG. 5(c). However, depending upon alternative circuit connections, alternating currents flowing in master induction coil 210 of master circuit 200a and in passive induction coil 220 of passive inductor circuit 200b can be oriented in opposite directions or in the same direction. For example, the master and passive circuit connections illustrated in FIG. 5(a) through FIG. 5(c) produces an alternating current flow in passive induction coil 220 of the passive inductor circuit that is instantaneously oriented in the opposite direction to coil current flowing in master induction coil 210 of the master circuit. This opposing direction current orientation is beneficial for obtaining hardness pattern shown, for example, in FIG. 1(b), FIG. 1(j) and FIG. 1(k), which are the most commonly desirable hardness patterns for a majority of inner bearing races used, for example, in automotive applications. In contrast, if the desirable hardness pattern is as illustrated, for example in FIG. 1(c), then it would be beneficial to change the circuit arrangement of the passive inductor circuit to orient instantaneous coil current flowing in passive induction coil 220 in the same direction as the master inductor circuit current provided by the connected power supply and flowing in master induction coil 210. One possible example of such connection is illustrated on FIG. 5(e). FIG. 5(f) and FIG. 5(g) illustrate alternative instantaneous current flows in the passive induction coil of a passive inductor circuit. FIG. 5(f) illustrates an instantaneous direction of alternating current flow for passive inductor circuit 200b with passive induction coil 220 for the electric circuit shown in FIG. 5(b) and FIG. 5(c). FIG. 5(g) illustrates an instantaneous direction of alternating current flow for passive inductor circuit 200b' with passive induction coil 220' shown in FIG. 5(e). Regardless of having the same instantaneous orientation of electrical current flowing in passive circuit 202 shown on FIG. 5(f) and FIG. 5(g), the electrical current flowing in passive induction coil 220' (FIG. 5(g)) is oriented in the opposite direction to the electrical current flowing in passive coil 220 (FIG. 5(f)).

For a typical design application of an embodiment of the induction heat treatment apparatus of the present invention a sufficient electromagnetic coupling between master inductor circuit 200a and passive inductor circuit 200b, the difference between the current flowing in the master induction coil 210 of master inductor circuit 200a as supplied to the power terminal connections 6a and 6b from an alternating currently power source and the current induced in passive induction coil 220 of passive inductor circuit 200b can be less than 10 percent and the difference can be further compensated for by profiling the geometry of coil heating face (for example by profiling copper geometry) of active induction coil 210 and passive induction coil 220. In some embodiments of the invention it is sufficient to provide a passive induction coil-to-workpiece gap between 0.25 mm to 2 mm smaller than the master induction coil-to-workpiece gap to compensate for the difference in magnitudes of currents flowing in master induction coil 210 and passive induction coil 220. In other embodiments of the invention, it is beneficial to strategically position the bearing race in the in-heat position so that the lower mass region of the bearing race area will be heated by a passive induction coil located in the passive inductor circuit. For example, region 115 in FIG. 2(a) has a smaller mass of metal required to be heat treated compared to region 106 in FIG. 2(a); thus, in the in-heat position it is beneficial to position passive induction coil 220 of the passive inductor circuit (lower current magnitude) for heating the smaller mass region 115 and to position master induction coil 210 of the active inductor circuit (higher current magnitude) for heating the larger mass region 106.

In the exemplary case shown in FIG. 2(a) and for illustration only, water-cooled round copper tubing is used for the coil fabrication. In other cases, the coil can be alternatively formed by: CNC machining a solid copper block; brazing suitable copper components; or die forming profiled heating faces of coil turns to accommodate the geometry of the inner bearing races 115 or the coil can be fabricated using an additive manufacturing technique, as a 3D printing.

Conventional magnetic flux concentrators 203 and 204 can be applied in an attempt to improve heating efficiency and concentrate the magnetic field generated by each turn 301 and 302 of a two-turn coil for heating the inner bearing races. Magnetic flux concentrators are normally fabricated from standard lamination packs, pure ferrites or conventional iron-based or ferrite-based powder materials (such as magnetic composites) containing pressed and/or sintered magnetic particles.

The coil configurations of the present invention illustrated in FIG. 5(a) through FIG. 5(d) allow having minimum possible induction coil-to-workpiece gaps without any restrictions associated with an obstruction of smaller diameter region 103 (for example as shown in FIG. 1(b)) during the loading and unloading. The present invention results in providing substantially closer coupling gaps between an induction coil and workpiece surface compared to known prior arts that results in high energy efficiency, better hardness pattern control, and also allows obtaining contour-like hardening patterns with minimal size and shape distortion, reduced maximum and peak temperatures during austenitization, and production of metallurgically sound microstructures with reduced probability of cracking of the bearing races during heat treatment and operation.

As required for a particular application induction heat treatment apparatus and method of the present invention is alternatively arranged in a vertical or horizontal orientation. In applications of vertical arrangement of the apparatus and method, a passive circuit 200b (including an induction coil 220) can be provided in combination with a support pedestal (for example a workpiece resting structure (nest)) where the bearing race to be heat treated is positioned. In this vertical arrangement the bearing race resting on the pedestal can be raised (lifted) into the heating position and held in the heating position for the heat treating cycle as illustrated on FIG. 8 through FIG. 10.

According to one possible design of the present invention, an induction coil of the master circuit 200a (FIG. 5(a)) is kept static and bearing race 100 (FIG. 1(a)) after being positioned on pedestal (or on the resting nest being a part of the passive circuit 200b including an induction coil 220) is moved in and out of the heating position. Since passive circuit 200b represents a closed-loop electrical system it can freely move in and out of the heating position, no electrical power connection cables carrying high electrical current needs to be moved with the passive circuit 200b. The mechanism for moving the workpiece in and out of the heating position can be hydraulic, pneumatic, or electric.

According to another design concept of the present invention, induction coil 210 of the master circuit 200a is moveable in and out of the heating position but bearing race 100 does not move in axial direction.

Depending upon hardness pattern specification and geometry essentials of the bearing race surfaces, the bearing race may be rotated (spun) during heating cycle using standard means. Conventional lift-rotate configuration as known in the art for small-sized and medium-sized workpieces can provide a low-cost machine option. A cylinder lifts the workpiece bearing race into the working position and an electric motor begins to rotate the part. As an option, an adjustable hard stop can be used for part positioning. In this case, a holding chuck or clamping block can hold the bearing race at a heating position while still allowing its rotation during heating and without having a necessity to be statically rested on a pedestal during its rotation.

In other embodiments of the invention, workpiece bearing race 100 is kept static during heating as disclosed herein.

Conventionally designed single-turn coils have an area where there is an inevitable distortion of the magnetic field takes place leading to some heat intensity reduction there. This area is associated with a region where copper buses that transmit electrical current from a power source are connected to an induction coil (so called region of the polarized coil power leads). Physical phenomenon responsible for that heat intensity reduction is referred to as electromagnetic field fringing effect (also called a fish-tail effect) and has been explained in the literature, for example, the Induction Heating Handbook. Workpiece rotation during heating helps eliminate (practically speaking) the heat deficit in the split area. If the workpiece bearing race is heated statically (without rotation), it is still possible to minimize heat intensity deviation there. Industry have developed a variety of standard means to effectively control and compensate the field-fringing effect in static induction heating applications using single-turn coils via appropriate coil copper profiling. Improved electromagnetic coupling (proximity effect) at the split region of the single-turn coil compensates for the magnetic field fringing eliminating the need to rotate the heated workpiece. Those techniques of field intensity compensation in the proximity of coil's split region have been disclosed in numerous publications including U.S. Pat. No. 6,274,857 and can be used in the present invention in cases when bearing race 100 is heated statically without rotation.

After a completion of the heating cycle and proper austenitization, the bearing race can be quenched in-place or out-of-place applying conventional quenching techniques suitable for a selected liquid quenchant or in cases of sufficient steel hardenability by applying alternative quench medium to liquid quench medium such as forced air quenching or gas quenching.

Figure 8A:
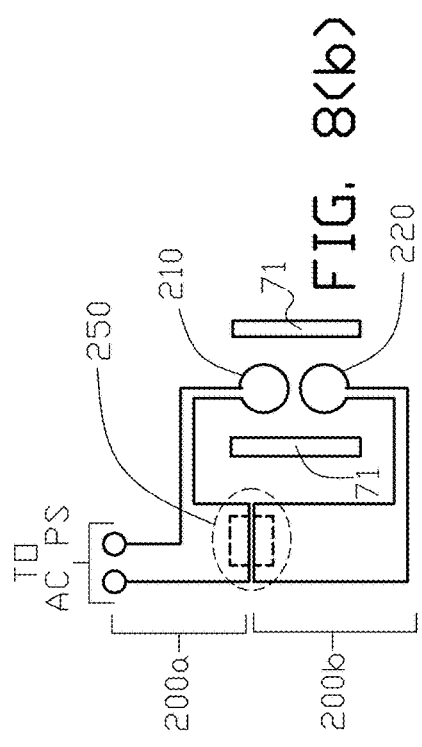
Figure 8B:
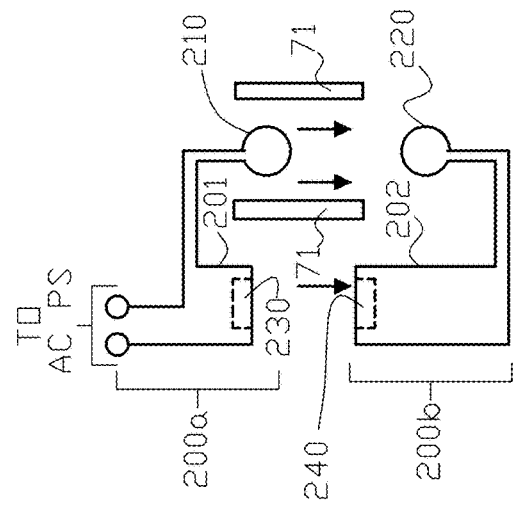
Figure 8C:
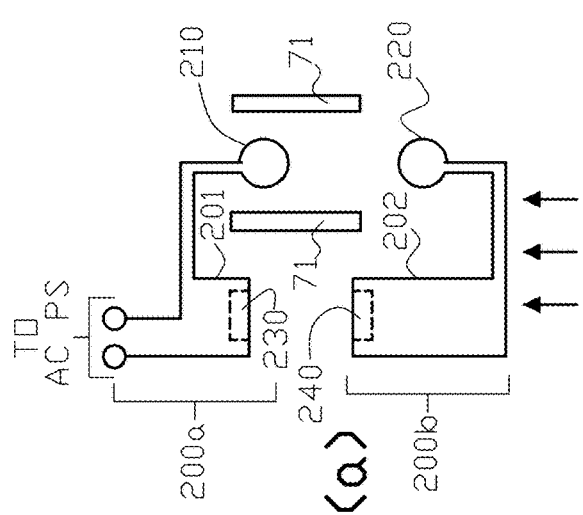
Figure 8D:
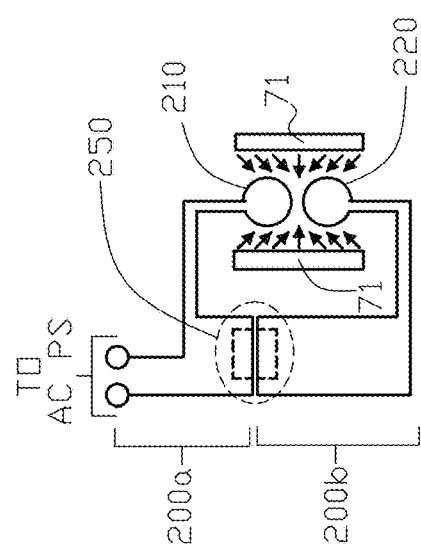

FIG. 8(a) through FIG. 8(d) diagrammatically illustrate one embodiment of a method of the present invention for bearing race heat treatment. The electric induction heating apparatus utilized in the illustrated method is formed, for example, from master inductor circuit 200a (FIG. 5(a)) and passive inductor circuit 200b (FIG. 5(b)). After loading a bearing race to be heat treated on a loading and unloading mounting pedestal or fixture (not illustrated in the figures) that positions the non-heat treated bearing race either within or around the outside of (depending upon whether the bearing race is an inner or outer race) master inductor coil 210 of master inductor circuit 200a with the heating apparatus separated (race load position) in FIG. 8(a), entire passive inductor circuit 200b (including passive coil 220, passive circuit magnetic couplers 240 and passive bus network 202) is raised to the race heating position shown in FIG. 8(b). In the race heating position, master circuit and passive circuit electromagnetic couplers 230 and 240 are positioned in close proximity to each other and surround corresponding segments of master bus network 201b and passive bus network 202b (see FIG. 5(a) through FIG. 5(c)) formed from copper electrical conductors to create electromagnetic link 250 (illustrated as dashed elliptical region in FIG. 8(b) when power is applied to master inductor circuit 200a via the connection to an alternating current power source (TO AC PS). In the process step shown in FIG. 8(b) coils 210 and 220 are located in their respective heating positions to begin the heat cycle for the desired bearing race regions, for example bearing race regions 101 and 102 in FIG. 1(b) if the bearing race being heated is bearing race 100 shown in FIG. 1(b). Upon completion of the heating cycle, power is removed from master inductor circuit 200a and the master and passive inductor circuits will de-energize, at which time, a spray quench cycle begins instantly or after a short time delay (also referred as a soak time) for quenching of the bearing race regions loaded in the heating apparatus as shown in FIG. 8(c) where a conventional spray quench device 71 (for example, a spray quench block or liquid quenchant sprayer) can be utilized. Depending upon geometry specifics of a bearing race and required hardness pattern, a short quench time delay could help to obtain suitable heat profile. Quench delay does not typically exceed 5 seconds. Upon completion of the spray quench cycle, the heat treated bearing races (not shown in the figures) and the entire passive inductor circuit 200b is lowered as shown in FIG. 8(d) to a bearing race unload position where unloading of the heat treated bearing race from the pedestal takes place. In a continuous sequential bearing race heat treatment process, a subsequent non-heat treated bearing race is loaded on the pedestal and the above induction heat treatment process described in FIG. 8(a) to FIG. 8(d) is repeated.

FIG. 9(a) through FIG. 9(d) diagrammatically illustrates another embodiment of a method of bearing race heat treatment of the present invention similar in some process steps for the method described in FIG. 8(a) to FIG. 8(d). In the method of FIG. 9(a) through FIG. 9(d) the first two process steps are as described above for the method steps illustrated in FIG. 8(a) and FIG. 8(b) except for the positioning of quench tank 70 below the bearing race heating apparatus. Upon a completion of the heating cycle, power is removed from master inductor circuit 200a and the master and passive inductor circuits will de-energize, at which time, the bearing race with heated and austenitized bearing race regions and entire passive inductor circuit 200b will be transferred from the bearing race heating position into quench tank 70 below the surface level of a fluid quenchant 70a where quench cycle begins as illustrated in FIG. 9(c). Preferably but not limiting, the fluid quenchant is agitated (for example, by stirring) in the quench tank to improve quench uniformity and other preferred cooling characteristics. Upon completion of the quench cycle, the quenched heat treated bearing race 100 (not shown in the figures) is raised to a position for unloading from the passive inductor coil by its mounting pedestal or fixture and unloaded from the mounting pedestal or fixture. In a continuous sequential bearing race heat treatment process, a subsequent non-heat treated bearing race is loaded on the mounting pedestal and the above induction heat treatment process described in FIG. 9(a) to FIG. 9(d) is repeated.

Some steels that can be used to form bearing races have poor metallurgical hardenability and therefore may be sensitive to a delay in quenching in the time period that occurs during transport of the bearing race to a quench tank as illustrated in method described above relative to FIG. 9(a) through FIG. 9(d). The temperature of such steels after being heated and austenitized can potentially drop below minimal needed temperature level and metallurgically undesirable structures can be formed upon delayed quenching. FIG. 10(a) through FIG. 10(d) diagrammatically illustrates another embodiment of a method of the present invention for bearing race heat treatment. The heat treatment method illustrated in FIG. 10(a) through FIG. 10(d) is a modification of the method illustrated in FIG. 9(a) through FIG. 9(d). The process steps identified in FIG. 9(a), FIG. 9(b) and FIG. 9(d) are similarly performed in process steps identified in FIG. 10(a), FIG. 10(b) and FIG. 10(d). The process step identified in FIG. 10(c) is modified from the process step in FIG. 9(c) in that spray quench block 72 quenches (as indicated by quench spray arrows) the heated and austenitized bearing race that is fixtured relative to passive inductor coil 220 as the entire passive inductor circuit 200b with the fixtured heated and austenitized bearing race is lowered into fluid quench 70a in quench tank 70 to complete the quenching process. The method illustrated in FIG. 10(a) through FIG. 10(d) is particularly useful when immediate and/or uninterrupted quenching after austenitization is required due the metallurgical properties of the heat treated bearing race.

Based on a common industry practice with electric induction heat treatment processes, the time period required for the quenching process step for a workpiece is typically 2 to 4 times longer than compared to the time period for the heating and austenitization process steps. Consequently the heat treatment production rate of heat treated bearing races and power supply utilization may be lower than desired in particular applications with any of the methods disclosed in FIG. 8(a) to FIG. 8(d); FIG. 9(a) to FIG. 9(d); and FIG. 10(a) to FIG. 10(d).

FIG. 11(a) and FIG. 11(b) diagrammatically illustrate another embodiment of a method of the present invention for bearing race heat treatment that is one alternative to raising the heat treated production rate of bearing races with improved power supply utilization. The electric heating apparatus utilized in the illustrated method is formed, for example, from master inductor circuit 200a'' with multiple master inductor coils 210a'' and 210b'' and passive inductor circuit 200b'' with multiple passive inductor coils 220a'' and 220b'' to form electric induction heating apparatus 245 shown in the bearing race heating position in FIG. 12(a). Heating apparatus 245 in FIG. 12(a) illustrates one method of the present invention for increasing the heat treated bearing race production and raising applied power utilization. In the method illustrated in FIG. 11(a) and FIG. 11(b) two bearing races (one in each of two master and passive induction coil pairs) can be simultaneously heat treated and then simultaneously quenched using an appropriate spray quenching device (such as device 73 in FIG. 11(a) or FIG. 11(b)) as known in the art or with alternative quench process steps, for example, but not limited to, those disclosed in the methods of FIG. 8(a) to FIG. 8(d); FIG. 9(a) to FIG. 9(d); and FIG. 10(a) to FIG. 10(d).

FIG. 12(a) illustrates an alternative arrangement of an electric induction heating apparatus of the present invention at a heating position while using multiple induction coils in the master and passive circuits, namely two coils 210a'' and 210b'' in the master inductor circuit and two coils 220a'' and 220b'' in the passive inductor circuit for simultaneously heating races on two bearing workpieces. In FIG. 12(a) only one bearing workpiece is illustrated for convenience. FIG. 12(b) is an enlarged view of the left end of the heating apparatus in FIG. 12(a).

As shown on FIG. 11(a) to FIG. 11(b), multiple coils 210a'' and 220b'' of a master inductor circuit 200a'' are connected electrically in series. In an alternative arraignment of an electrical heating apparatus of the present invention multiple coils 210a'' and 220b'' of a master inductor circuit 200a'' can be connected electrically in parallel or in its combination. Similarly, multiple coils 220a'' and 220b'' in the passive circuit 200b'' can also be connected electrically in parallel or having a combination of series/parallel connections.

A rotary turntable can be used to increase a production rate, where quenching can be done at multiple locations outside of the heating position. This type of system can also be used if the component requires hardening different areas positioned on the same workpiece. Rotary table can be arranged horizontally, vertically or can be angled.

FIG. 13 illustrates one example of an induction heating system of the present invention comprising a vertically oriented rotary table 330 having three stations for heat treatment processing two workpiece bearings at the same time. With the counterclockwise rotation of the table as indicated by the arrow, two workpiece bearings 100x to be heat treated are loaded onto the rotary table at table station 333 which can be referred to as the prior-heat load and post-heat unload station; two workpiece bearings 100y are loaded into a dual workpiece heating apparatus of the present invention (for example heating apparatus 245 shown in FIG. 12(a)) adjacent to table station 331 (bearing workpiece heating station) where the bearing races are loaded into apparatus 245; inductively heated; austenitized and unloaded from apparatus 245; and two heated and austenitized workpiece bearings 100z are at quench table station 332 where they are quenched in quenchant 70a (shown as stippled quenchant surface area in the drawing) in quench tank 70. The rotary table indexes two workpiece bearings at a time from table station 331, to table station 332 to table station 333. In some embodiments of the invention a supplementary spray quench device (not shown in the drawing) is installed between heat table station 331 and quench table station 332 to quench workpiece austenitized bearing race features during transport between these two stations. The supplementary spray quench device may be similar to spray quench block 72 in FIG. 10(c) to provide motionless or agitated liquid quenchant. In other embodiments of the invention a plurality of table stations for heating or quenching, or alternatively heating and quenching are provided. In other embodiments of the invention the rotary table is oriented horizontal or an angle skew from horizontal or vertical. Bearing race features can be heated while stationary in the rotary table's heating devices or rotated by conventional rotation apparatus, such as a rotary actuator, as known in the art. In other embodiments of the invention a shuttle apparatus is used to perform the function of the rotary table to transport workpiece bearings among different process positions (for example, from heating to quenching to loading and unloading positions).

FIG. 17(a) diagrammatically illustrates another aspect of the present invention that comprises a split multiple coil electric induction heating system having a split inductor assembly for simultaneous heating of a plurality of bearing features on a bearing component and alternating current (AC) power source 160a that contains at least two phase-locked outputs 161 and 162. Any AC power sources known in the art, including but not limited to, electrical devices manufactured based on a semiconductor technology (for example, thyristor-based or transistor-based AC power sources) are suitable for use as AC power source 160a as long as they have at least two phase-locked outputs 161 and 162.

The split inductor assembly comprises two master inductor assemblies separable at a bearing component heating position. First master inductor circuit conductor network 6a and 6b connects the first phase-locked output 161 of AC power source 160a with first master heating inductor 210 (as illustrated in FIG. 17(a)). Second master inductor circuit conductor network 6c and 6d connects the second phase-locked output 162 of AC power source 160a to the second master heating inductor 220.

Thanks to the phase-locked capability of outputs of AC power source 160a, instantaneous inductor electrical current flow in the first master heating inductor 210 and instantaneous electrical current flow in the second master heating inductor 220 can be oriented in the opposite directions as illustrated by current waveforms in FIG. 17(b) or instantaneous inductor electrical current flow in the first master heating inductor 210 and instantaneous electrical current flow in the second master heating inductor 220 can be oriented in the same direction as illustrated by current waveforms in FIG. 17(c). Therefore, depending upon hardness pattern requirements for the bearing features (for example, interrupted bearing race hardness pattern illustrated on FIG. 1(b) or non-interrupted bearing race hardness pattern illustrated on FIG. 1(c)), this phase-locked capability of the outputs of AC power source according to an alternative embodiment of the present invention will provide a desirable orientation of instantaneous electrical current flow in the first master heating inductor 210 and the second master heating inductor 220 (similar those shown on FIG. 5(c), FIG. 5(f) or FIG. 5(g)).

Electrical power supplied by each of at least two phase-locked outputs 161 and 162 of AC power source 160a and (therefore, electrical power supplied to each of heating inductors 210 and 220) is controlled independently which allow compensation for possible differences in masses of the heated metal as illustrated on FIG. 1(b) (compare zones 101 and 102 of bearing features or regions where rolling elements (for example, balls or rollers) ride against inner bearing races 101a and 102a respectively).

As an alternative approach to using a single AC power source 160a with phase-locked capability of multiple outputs 161 and 162, one skilled in the art and having the benefit of the teachings of a specification described above may use two different AC power sources with a phase-locked capability of output powers instead of using a single AC power source 160a described above. This modification does not depart from the scope of present invention.

Though master-passive design concept (e.g., FIG. 5(c) or FIG. 12(a)) is more cost-effective approach due to requiring a conventional and less complicated AC power source 160, compared to more complex AC power source 160a, under certain conditions the use of AC power source 160a containing at least two phase-locked outputs 161 and 162 might be beneficial and preferable exhibiting certain process advantages. These conditions include, but are not limited to, applications of higher frequencies (for example, frequencies of 70 kHz to 600 kHz range). Alternatively or in addition to these conditions include applications where there are significant differences in masses of metals required to be simultaneously heated (differences in above-discussed masses can be associated with correspondent differences in geometries of bearing features required to be hardened (compare zones 101 and 102 of bearing features or regions where rolling elements ride against inner bearing races 101a and 102a respectively as shown on FIG. 1(b)). Alternatively or in addition to these conditions include applications where a bearing component consists of more than two bearing features required to be heat treated simultaneously and have substantially different geometries. Alternatively or in addition to these conditions include applications where bearing component consists of a plurality of bearing features exhibiting a combination of interrupted and non-interrupted hardness patterns. These are just a few exemplary cases where the use of an induction heating system having multiple master inductors (such as FIG. 17(a), for example) might be preferable.

FIG. 18 illustrates diagrammatically another aspect of the present invention comprising a split multiple coil electric induction heating system having a split inductor assembly for simultaneous heating of a plurality of bearing features on a bearing component comprising a conventional AC power source 160 having a single output connected to a primarily winding 222a of an output transformer 222 which has at least two secondary windings 222b and 222c. Secondary windings 222b and 222c are connected via correspondent outputs 161a and 162a of an output transformer 222 and correspondent master inductor circuit conductor networks 6a-6b and 6c-6d to two correspondent master inductors 210 and 220.

First master inductor circuit conductor network 6a and 6b connects the first output 161a of a transformer 222 and the first master heating inductor 210. Second master inductor circuit conductor network 6c and 6d connects the second output 162a of a transformer 222 and the second master heating inductor 220 (see FIG. 18).

Each of two master inductor circuit conductor networks 6a-6b and 6c-6d may consist of standard power control devices (not shown on FIG. 18) such as thyristor-based or thyristor-based AC regulators that are known in the art and commonly used in industry allowing regulation of powers supplied to each of heating inductors 210 and 220 independently.

By changing the relative configuration of secondary windings 222b and 222c of transformer 222 in respect to each other, it is possible to orient instantaneous electrical currents flowing in the heating inductors 210 and 220 in the same direction or in opposite directions in respect to each other (whatever is desirable for obtaining required hardness patterns). In applications where an interrupted hardness pattern is required (as shown on FIG. 1(b), for example), it is advantageous configure secondary windings 222b and 222c of transformer 222 in such way that instantaneous electrical currents flowing in the heating inductors 210 and 220 would be oriented in opposite directions. In contrast, if non-interrupted hardness pattern is required (as shown on FIG. 1(c), for example), it is advantageous to configure secondary windings 222b and 222c of transformer 222 in such way that instantaneous electrical currents flowing in the heating inductors 210 and 220 would be oriented in the same direction.

Master-passive design concept (FIG. 5(c) and FIG. 12(a), for example) is more cost-effective and is relatively simple design allowing elimination of the need of using a transformer 222 that has at least two secondary windings of a specific configuration, however, under certain conditions the use of circuitry shown on FIG. 18 might exhibit certain process advantages. These conditions include but are not limited to applications of low and medium frequencies (e.g., 500 Hz to 6 kHz range). Alternatively or in addition to these conditions include applications where appreciably deep hardness case depths are required (for example, case depths of 3 mm to 9 mm deep). Alternatively or in addition to these conditions include applications exhibiting substantial differences in masses of metals required to be simultaneously heated (which are associated with correspondent differences in geometries of bearing features required to be hardened, such as zones 101 and 102 of bearing features or regions where rolling elements ride against inner bearing races 101a and 102a respectively as shown on FIG. 1(b)). These are just a few exemplary cases where the use of an induction heating system shown on FIG. 18 might be beneficial.

A single-turn inductor is utilized in the above embodiments of the invention. In alternative embodiments of the invention two or more turn induction coils are utilized (for example, depending upon a particular application, a multi-turn active coil and a multi-turn passive coil can also be used instead of a single-turn inductor style).

Coil copper round tubing is utilized for the master and passive coils in the above embodiments of the invention. In alternative embodiments of the invention other coil configurations are used in particular applications including profiled coil copper.

Magnetic flux concentrators identified above of a specified geometric shape, for example U-shaped or ring-shaped magnetic flux compensators, may be of alternative geometric shapes, or assembled from flux concentrators of other shapes as required for a specific application.

When heating inner surface (inner race) of a thin-walled bearing component for austenitization, a spray quenching of outer surface can be applied during an entire heat cycle or during a fraction of the heat cycle. This helps to prevent (if required) through hardening or excessive hardening depth when heat treating thin-walled bearing components. Similarly, in order to prevent (if required) through hardening or excessive hardening when heating outer surface (outer race), a spray quench can be applied for inner surface.

Figure 1E:
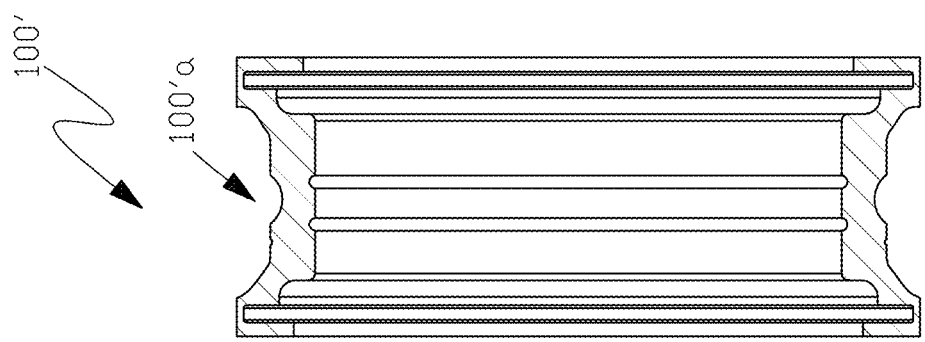
FIG. 1(d) and FIG. 1(e) are perspective views of a configured outer bearing race in bearing workpiece 100'.
Figure 1D:
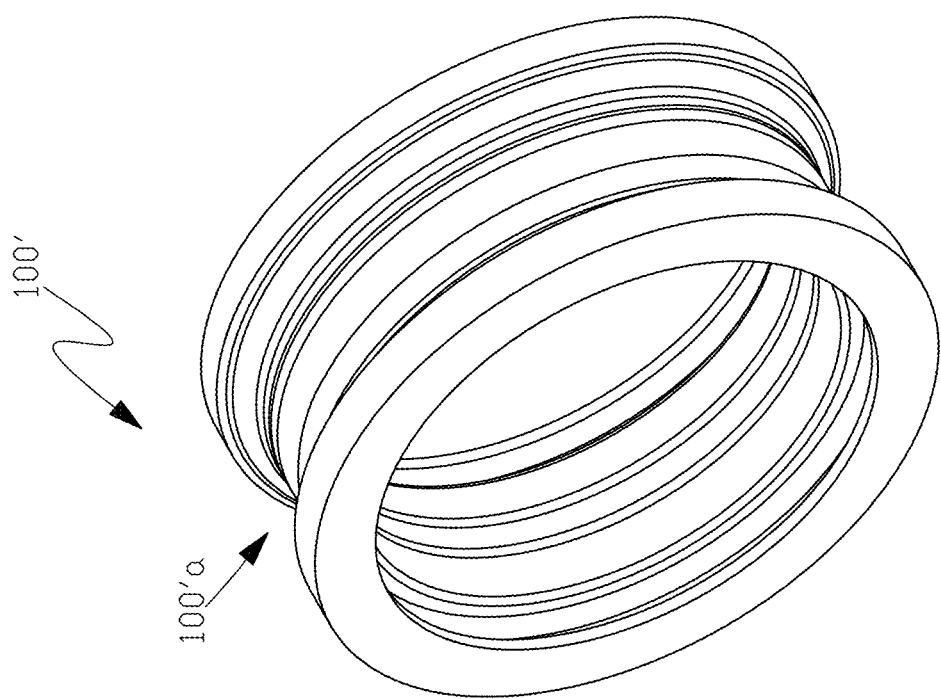
Figure 1K:
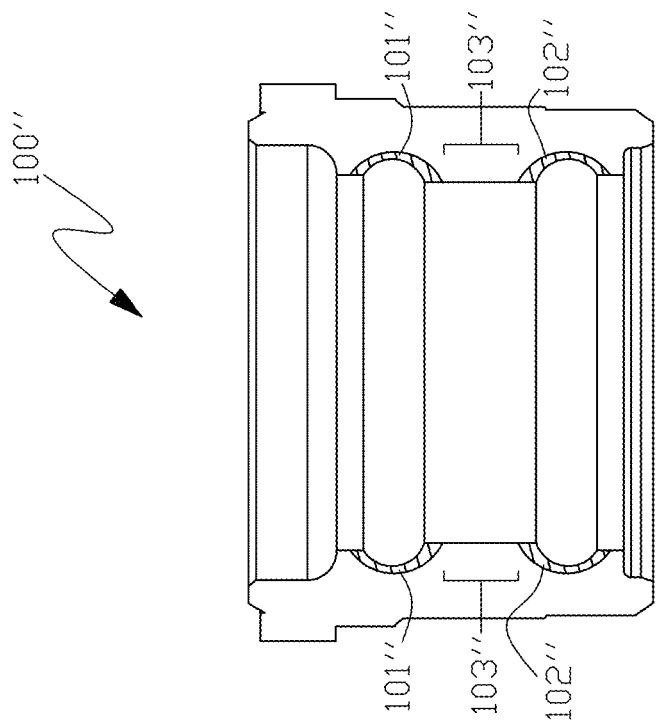
FIG. 1(k) is a cross sectional elevation view of the configured inner bearing race shown in FIG. 1(j) illustrating an interrupted hardness pattern, which contains two hardened zones 101" and 102" separated by non-hardened zone (or region) 103".
Figure 1J:
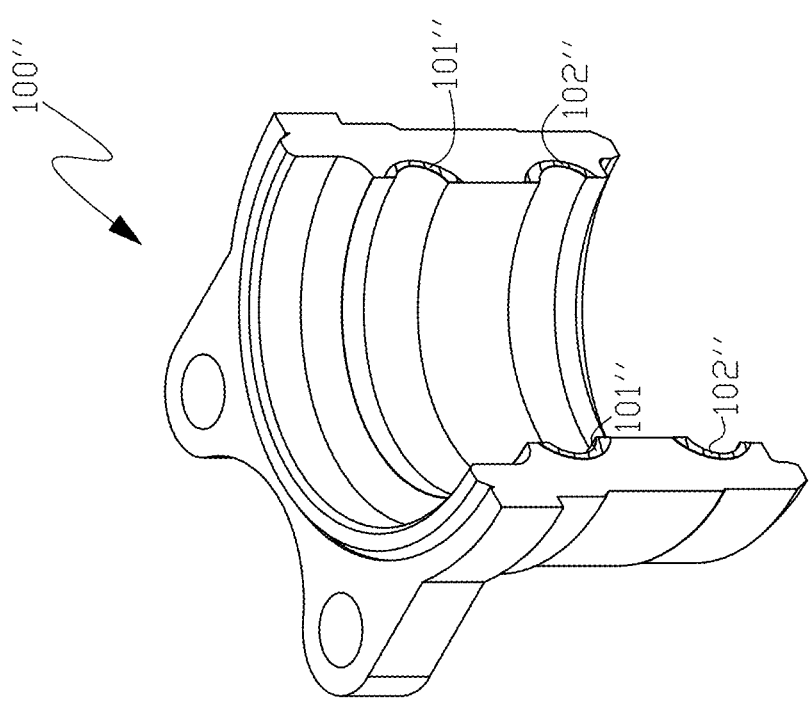
FIG. 1(j) is a side perspective cross sectional view of a configured inner bearing race in bearing workpiece 100" that is commonly used in heavy duty bearings for automotive powertrains and drivetrains, and other heavy duty applications exhibiting bearing race zones having identical geometries and uniform (that is highly desirable) hardness patterns 101" and 102".
Figure 3B:
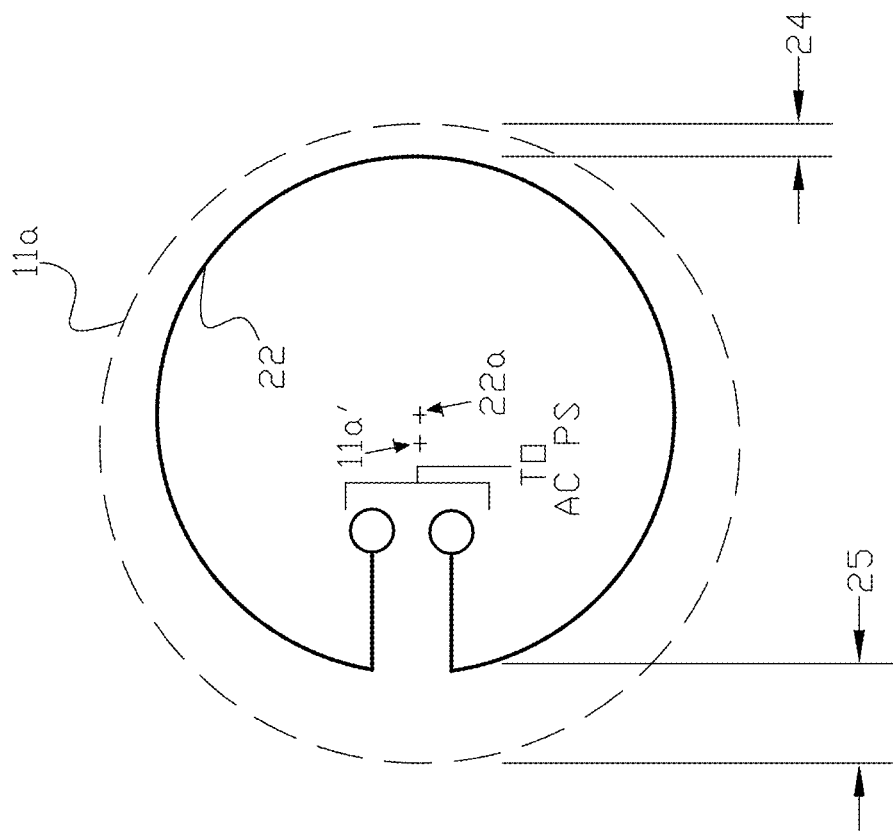
FIG. 3(a) and FIG. 3(b) are diagrammatic illustrations of an induction heating process for heat treating inner bearing races that conceptually shows uniform and non-uniform circumferential clearance distances between the inductor and a bearing workpiece's inner bearing race 11a, as diagrammatically represented by the dashed line circular boundary of the inner race being heated.
Figure 3A:
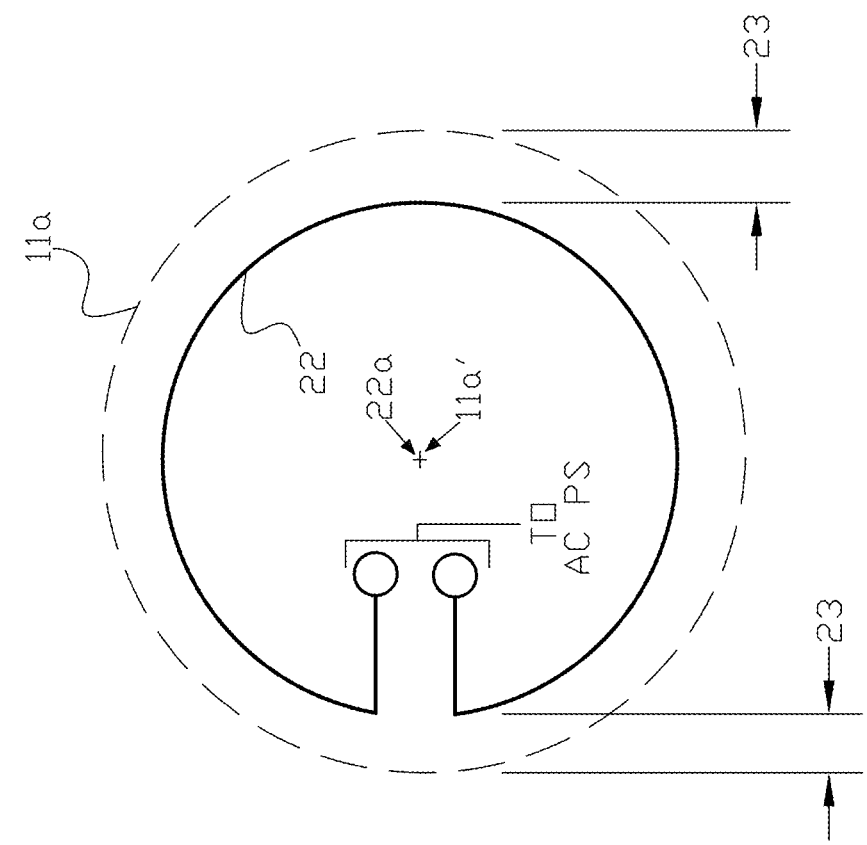
Figure 4:
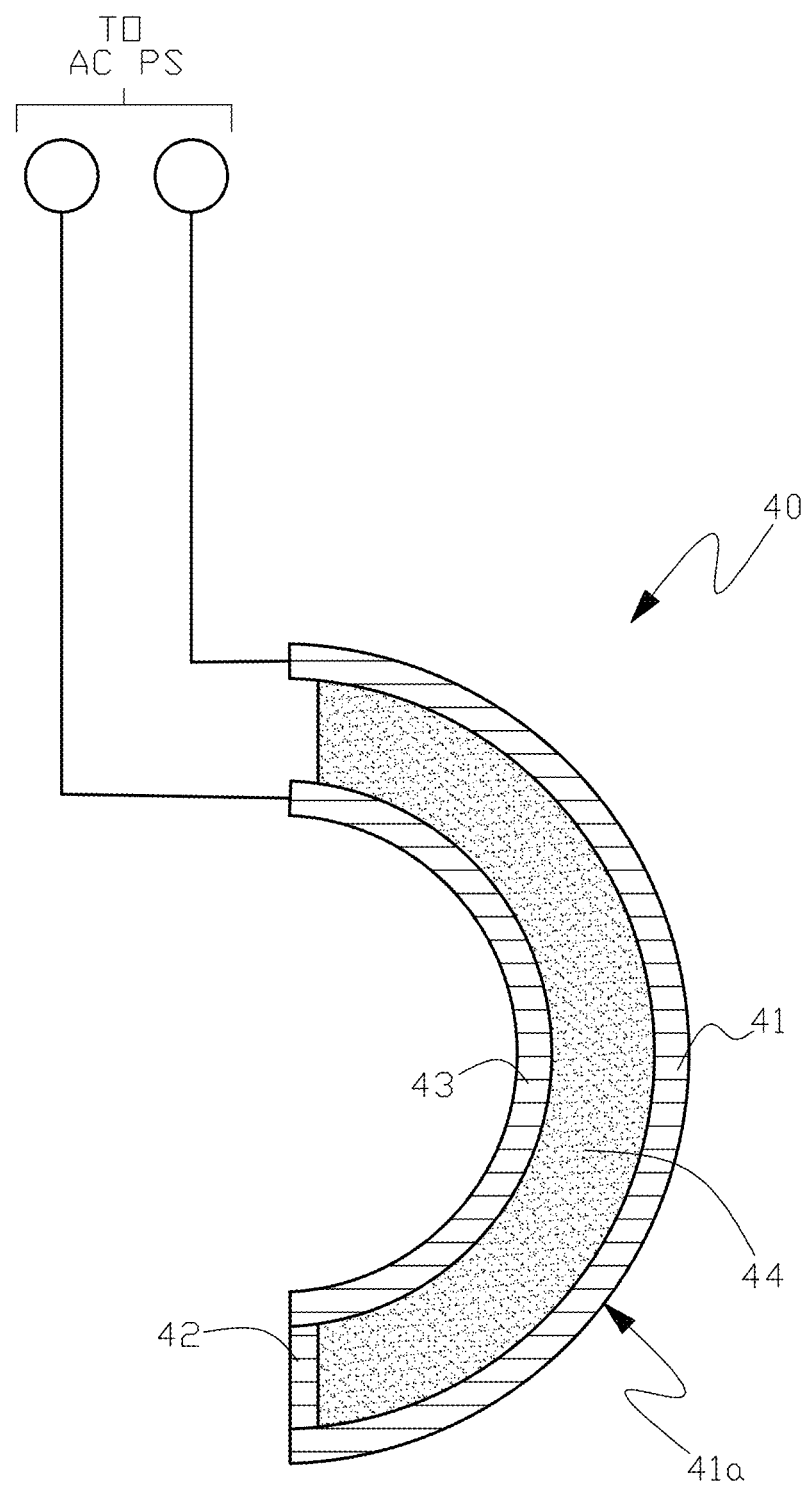
FIG. 4 is a diagrammatic illustration of a prior art arc-shaped inductor 40 (also known as a hairpin inductor) that can be used for heat treating a configured inner bearing race.

Alternative embodiments of the induction heat treatment apparatus and method are applied to applications where the bearing race surface or race regions to be heat treated are other than inner bearing races, by way of example and not limitation, for example outer bearing races and ball raceways 100' illustrated in the bearing races of FIG. 1(d) and FIG. 1(e). In other embodiments of the invention, for example, outer bearing races, the complementary master inductor coil and passive inductor coil can be configured to be disposed externally around the outer bearing in the heating position.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A split multiple coil electric induction heating system having a split inductor assembly for simultaneous heating of a plurality of bearing features on a bearing component, the split inductor assembly comprising a master inductor assembly and a passive inductor assembly separable from a bearing component heating position, the split multiple coil electric induction heating system comprising:
   a master inductor circuit disposed on the master inductor assembly, the master inductor circuit comprising:
      a master heating inductor for heating at least one first bearing feature;
      a master magnetic flux coupler;
      a master inductor circuit power terminals; and
      a master inductor circuit conductor network connecting the master inductor circuit power terminals to the master heating inductor, the master magnetic flux coupler disposed adjacent to and physically separated by an air gap or a dielectric material gap from the master inductor circuit conductor network; and
   a passive inductor circuit disposed on the passive inductor assembly, the passive inductor circuit comprising:
      a passive heating inductor for heating at least one second bearing feature;
      a passive magnetic flux coupler; and
      a passive inductor circuit conductor network forming a closed series electrical circuit with the passive heating inductor, the passive magnetic flux coupler disposed adjacent to and physically separated from the passive inductor circuit conductor network, the passive magnetic flux coupler positioned adjacent to and physically separated by an air gap or a dielectric material gap from the master magnetic flux coupler so that when the master inductor circuit and the passive inductor circuit are in the bearing component heating position for inductively heating the at least one first bearing feature and the at least one second bearing feature and a master circuit alternating current is applied to the master inductor circuit power terminals, a master inductor circuit magnetic field couples with the passive inductor circuit via the passive magnetic flux coupler being magnetically coupled with the master magnetic flux coupler to generate a passive circuit alternating current in the passive inductor circuit conductor network.

2. A split multiple coil electric induction heating system of claim 1 wherein the master heating inductor comprises a single turn solenoidal coil and the passive heating inductor comprises a single turn solenoidal coil.

3. A split multiple coil electric induction heating system of claim 1 wherein the at least one first bearing feature or the at least one second bearing feature is positioned at least partially around an exterior of the master heating inductor or the passive heating inductor to inductively heat an interior bearing feature of the bearing component.

4. A split multiple coil electric induction heating system of claim 1 wherein the at least one first bearing feature or the at least one second bearing feature is positioned at least partially around an interior of the master heating inductor or the passive heating inductor to inductively heat an exterior bearing feature of the bearing component.

5. A split multiple coil electric induction heating system of claim 1 wherein the master heating inductor and the passive heating inductor are configured for a counter instantaneous current flows.

6. A split multiple coil electric induction heating system of claim 1 further comprising a split inductor assembly positioning apparatus configured to alternatively:
   (a) longitudinally align the master heating inductor of the master inductor assembly with the passive heating inductor of the passive inductor assembly and position the passive magnetic flux coupler adjacent to and physically separated from the master magnetic flux coupler when the at least one first bearing feature is positioned for inductive heating with the master heating inductor and the at least one second bearing feature is positioned for inductive heating with the passive heating inductor for simultaneous heating of the at least one first bearing feature and the at least one second bearing feature; and
   (b) longitudinally separate the master heating inductor of the master inductor assembly from the passive heating inductor of the passive inductor assembly for positioning of the bearing component in the bearing component heating position for inductive heating of the at least one first bearing feature and the at least one second bearing feature or removal of the bearing component after inductive heating of the at least one first bearing feature and the at least one second bearing feature in the bearing component heating position.

7. A split multiple coil electric induction heating system of claim 1 further comprising a quench system for quenching out an austenitized regions of the at least one first bearing feature and the at least one second bearing feature after inductive heating, the quench system having a quenchant application apparatus for alternatively, or in combination, quenching in the bearing component heating position, in a transition from the bearing component heating position to a remote quenching station, at the remote quenching station.

8. A split multiple coil electric induction heating system of claim 1 further comprising a second master heating inductor in electrical series connection with the master heating inductor and a second passive heating inductor in electrical series connection with the passive heating inductor configured for respectively heating at least one first bearing feature and at least one second bearing feature on a second bearing component.

9. A split multiple coil electric induction heating system of claim 8, the master inductor assembly and the passive inductor assembly configured to be disposed adjacent to a bearing workpiece heating station, the split multiple coil electric induction heating system further comprising:
  a rotary table comprising:
    a bearing workpiece rotary table prior-heat load and post-heat unload station for loading the bearing component and the second bearing component to the rotary table and unloading the bearing component and the second bearing component from the rotary table;
    the bearing workpiece heating station for loading the bearing component and the second bearing component to the master inductor assembly and the passive inductor assembly for inductive heating and unloading the bearing component and the second bearing component from the master inductor assembly and the passive inductor assembly after inductive heating;
    a bearing workpiece quench station for quenching out the bearing component and the second bearing component after inductive heating; and
    a rotary actuator for moving the bearing component and the second bearing component from the bearing workpiece rotary table prior-heat load and post-heat unload station, the bearing workpiece heating station, the bearing workpiece quench station and the bearing workpiece rotary table prior-heat load and post-heat unload station.

10. A split multiple coil electric induction heating system having a split inductor assembly for simultaneous heating of a plurality of bearing features on a bearing component, the split inductor assembly comprising a master inductor assembly and a passive inductor assembly separable from a bearing component heating position, the split multiple coil electric induction heating system comprising:
  a master inductor circuit arranged on the master inductor assembly, the master inductor circuit comprising:
    a master heating inductor for heating a first bearing feature, the master heating inductor comprising a single turn master solenoidal coil arranged at a first mandrel end around an outer mandrel perimeter of a vertically oriented mandrel having a vertically oriented mandrel central longitudinal axis;
    a master magnetic flux coupler;
    a master inductor circuit power terminals; and
    a master inductor circuit conductor network connecting the master inductor circuit power terminals to the master heating inductor, the master magnetic flux coupler disposed adjacent to and physically separated from the master inductor circuit conductor network; and
  a passive inductor circuit arranged on the passive inductor assembly, the passive inductor circuit comprising:
    a passive heating inductor for heating a second bearing feature; the passive heating inductor comprising a single turn passive solenoidal coil arranged at a first support structure end around an outer support structure perimeter of a vertically oriented support structure having a vertically oriented support structure central longitudinal axis;
    a passive magnetic flux coupler; and
    a passive inductor circuit conductor network forming a closed series electrical circuit with the passive heating inductor, the passive magnetic flux coupler disposed adjacent to and separated by an air gap or a dielectric material gap from the passive inductor circuit conductor network, the passive magnetic flux coupler positioned adjacent to and physically separated from the master magnetic flux coupler so that when the master inductor circuit and the passive inductor circuit are in a bearing component heating position for inductively heating the first bearing feature and the second bearing feature and a master circuit alternating current is applied to the master inductor circuit power terminals, a master inductor circuit magnetic field couples with the passive inductor circuit via the passive magnetic flux coupler being magnetically coupled with the master magnetic flux coupler to generate a passive circuit alternating current in the passive inductor circuit conductor network.

11. A split multiple coil electric induction heating system of claim 10 wherein the at least one first bearing feature or the at least one second bearing feature is positioned at least partially around an exterior of the master heating inductor and the passive heating inductor to inductively heat an interior bearing feature of the bearing component.

12. A split multiple coil electric inductor heating system of claim 10 further comprising at least one master inductor magnetic flux concentrator disposed either above or below the single turn master solenoidal coil on the vertically oriented mandrel.

13. A split multiple coil electric inductor heating system of claim 11 further comprising at least one passive inductor magnetic flux concentrator disposed either above or below the single turn passive solenoidal coil on the vertically oriented support structure.

14. A split multiple coil electric inductor heating system of claim 10, the vertically oriented mandrel having a plurality of quenchant openings to supply a quenchant to the first bearing feature and the second bearing feature from an interior plenum of the vertically oriented mandrel.

15. A split multiple coil electric induction heating system of claim 10 further comprising a split inductor assembly positioning apparatus configured to alternatively:
  (a) longitudinally align the master heating inductor of the master inductor assembly with the passive heating inductor of the passive inductor assembly and position the passive magnetic flux coupler adjacent to and physically separated from the master magnetic flux coupler when the first bearing feature is positioned for inductive heating with the master heating inductor and the second bearing feature is positioned for inductive heating with the passive heating inductor for simultaneous heating of the first bearing feature and the second bearing feature; and
  (b) longitudinally separate the master heating inductor of the split inductor assembly from the passive heating inductor of the split inductor assembly for positioning of the bearing component for inductive heating of the at least one first bearing feature and the at least one second bearing feature or removing of the bearing component after inductive heating of the at least one first bearing feature and the at least one second bearing feature.

16. A method of simultaneously heat treating a plurality of bearing features on a bearing component, the method comprising:

assembling a split inductor assembly from a master inductor assembly and a passive inductor assembly,
  a master inductor circuit disposed on the master inductor assembly, the master inductor circuit comprising:
    a master heating inductor for heating at least one first bearing feature on the bearing component;
    a master magnetic flux coupler;
    a master inductor circuit power terminals; and
    a master inductor circuit conductor network connecting the master inductor circuit power terminals to the master heating inductor, the master magnetic flux coupler disposed adjacent to and physically separated by an air gap or a dielectric material gap from the master inductor circuit conductor network; and
  a passive inductor circuit disposed on the passive inductor assembly, the passive inductor circuit comprising:
    a passive heating inductor for heating at least one second bearing feature on the bearing component;
    a passive magnetic flux coupler; and
    a passive inductor circuit conductor network forming a closed series electrical circuit with the passive heating inductor, the passive magnetic flux coupler disposed adjacent to and physically separated by an air gap or a dielectric material gap from the passive inductor circuit conductor network, the passive magnetic flux coupler disposed adjacent to and physically separated from the master magnetic flux coupler;
locating the bearing component with a longitudinal interior axis of the bearing component disposed within the master heating inductor and the passive heating inductor for induction heating of the at least one first bearing feature with the master heating inductor and induction heating of the at least one second bearing feature with the passive heating inductor;
applying a master alternating current to the master inductor circuit power terminals so that when the master inductor circuit and the passive inductor circuit are in an assembled position a master inductor circuit magnetic field couples with the passive inductor circuit via the passive magnetic flux coupler to generate a passive circuit alternating current in the passive inductor circuit conductor network to inductively heat the at least one first bearing feature and the at least one second bearing feature.

17. The method of claim 16 further comprising locating an outer longitudinal surface of the bearing component at least partially within the master heating inductor or the passive heating inductor to heat an exterior bearing feature on the bearing component.

18. The method of claim 16 further comprising locating an inner longitudinal surface of the bearing component at least partially within the master heating inductor or the passive heating inductor to heat an interior bearing feature on the bearing component.

19. The method of claim 16 further comprising separating the master inductor assembly and the passive inductor assembly in opposing longitudinal end directions of the bearing component for removing the bearing component from the assembled position after inductive heating of the bearing component and joining the master inductor assembly and the passive inductor assembly in opposing longitudinal end directions of the bearing component for positioning in the assembled position.

20. The method of claim 16 further comprising quenching out an austenitized region of the at least one first bearing feature and the at least one second bearing feature alternatively, or in combination, with the bearing component disposed in the assembled position of the split inductor assembly; at a remote quenching station; or at a combination of a transition from the assembled position of the split inductor assembly and the remote quenching station.

21. A split multiple coil electric induction heating system having a split inductor assembly for simultaneous heating of a bearing feature on a bearing component, the split inductor assembly comprising a master inductor assembly and a passive inductor assembly separable from a bearing component heating position, the split multiple coil electric induction heating system comprising:
  a master inductor circuit disposed on the master inductor assembly, the master inductor circuit comprising:
    a master heating inductor for partially heating the bearing feature;
    a master magnetic flux coupler;
    a master inductor circuit power terminals; and
    a master inductor circuit conductor network connecting the master inductor circuit power terminals to the master heating inductor, the master magnetic flux coupler disposed adjacent to and physically separated by an air gap or a dielectric material gap from the master inductor circuit conductor network; and
  a passive inductor circuit disposed on the passive inductor assembly, the passive inductor circuit comprising:
    a passive heating inductor for partially heating the bearing feature;
    a passive magnetic flux coupler; and
    a passive inductor circuit conductor network forming a closed series electrical circuit with the passive heating inductor, the passive magnetic flux coupler disposed adjacent to and physically separated from the passive inductor circuit conductor network, the passive magnetic flux coupler positioned adjacent to and physically separated by an air gap or a dielectric material gap from the master magnetic flux coupler so that when the master inductor circuit and the passive inductor circuit are in a bearing component heating position for inductively heating the bearing feature and a master circuit alternating current is applied to the master inductor circuit power terminals, a master inductor circuit magnetic field couples with the passive inductor circuit via the passive magnetic flux coupler being magnetically coupled with the master magnetic flux coupler to generate a passive circuit alternating current in the passive inductor circuit conductor network.

* * * * *